US007142251B2

(12) United States Patent  
Sha et al.

(10) Patent No.: US 7,142,251 B2  
(45) Date of Patent: Nov. 28, 2006

(54) VIDEO INPUT PROCESSOR IN MULTI-FORMAT VIDEO COMPRESSION SYSTEM

(75) Inventors: Li Sha, San Jose, CA (US); Shuhua Xiang, Fremont, CA (US); Yaojun Luo, San Jose, CA (US); He Ouyang, Cupertino, CA (US)

(73) Assignee: Micronas USA, Inc., Santa Clara, CA (US)

( * ) Notice: Subject to any disclaimer, the term of this patent is extended or adjusted under 35 U.S.C. 154(b) by 646 days.

(21) Appl. No.: 10/210,254

(22) Filed: Jul. 31, 2002

(65) Prior Publication Data

US 2005/0206784 A1   Sep. 22, 2005

Related U.S. Application Data

(60) Provisional application No. 60/309,239, filed on Jul. 31, 2001.

(51) Int. Cl.  
*H04N 9/46* (2006.01)

(52) U.S. Cl. .................. 348/557; 348/450; 348/458; 348/556; 345/604; 345/603

(58) Field of Classification Search ............... 348/555, 348/569, 557, 566, 554, 563, 567, 441, 453, 348/454, 457, 556; 345/604, 603; *H04N 5/445*  
See application file for complete search history.

(56) References Cited

U.S. PATENT DOCUMENTS

| 4,873,684 | A | 10/1989 | Kobayashi et al. |
|---|---|---|---|
| 5,187,577 | A | 2/1993 | Kim |
| 5,228,130 | A | 7/1993 | Michael |
| 5,299,144 | A | 3/1994 | Bartkowiak et al. |
| 5,341,492 | A | 8/1994 | Sakata |
| 5,361,220 | A | 11/1994 | Asano |
| 5,398,078 | A | 3/1995 | Masuda et al. |
| 5,633,897 | A | 5/1997 | Fettweis et al. |
| 5,694,127 | A | 12/1997 | Tayama |
| 5,706,001 | A | 1/1998 | Sohn |
| 5,706,002 | A | 1/1998 | Meehan et al. |
| 5,799,201 | A | 8/1998 | Lorenz et al. |
| 5,835,145 | A | 11/1998 | Ouyang et al. |
| 5,941,940 | A | 8/1999 | Prasad et al. |
| 6,038,675 | A | 3/2000 | Gabzdyl et al. |
| RE37,048 | E | 2/2001 | McCollum |
| 6,209,017 | B1 | 3/2001 | Lim et al. |
| 6,243,734 | B1 | 6/2001 | Doshi et al. |
| 6,407,680 | B1 | 6/2002 | Lai et al. |
| 6,421,094 | B1 * | 7/2002 | Han .......................... 348/569 |
| 6,421,695 | B1 | 7/2002 | Bae et al. |
| 6,463,445 | B1 | 10/2002 | Suzuki et al. |
| 6,507,293 | B1 | 1/2003 | Deeley et al. |
| 6,516,031 | B1 | 2/2003 | Ishihara et al. |
| 6,523,071 | B1 | 2/2003 | Klinger et al. |

(Continued)

*Primary Examiner*—Michael H. Lee  
(74) *Attorney, Agent, or Firm*—Michael A. Molano; Mayer Brown Rowe & Maw LLP

(57) ABSTRACT

A video input processor is provided to process different input video format, including RGB, RGB Bayer, YUV 4:2:2 interlaced and progressive video data. The video input processor also uses an advanced algorithm to efficiently convert video data in RGB color space to YUV color space. The video input processor further enables multi-functions such as video image scaling, video image filtering before the video data are output for further video compression.

20 Claims, 16 Drawing Sheets

U.S. PATENT DOCUMENTS

| | | |
|---|---|---|
| 6,552,673 B1 | 4/2003 | Webb |
| 6,587,057 B1 | 7/2003 | Scheuermann |
| 6,591,381 B1 | 7/2003 | Kim et al. |
| 6,593,860 B1 | 7/2003 | Lai et al. |
| 6,647,061 B1 | 11/2003 | Panusopone et al. |
| 6,701,405 B1 | 3/2004 | Adusumilli et al. |
| 6,704,493 B1 * | 3/2004 | Matthews et al. ............ 386/98 |
| 6,728,862 B1 | 4/2004 | Wilson |
| 2001/0016884 A1 | 8/2001 | Sato et al. |
| 2002/0015528 A1 * | 2/2002 | Kondo et al. ................ 382/224 |
| 2002/0196855 A1 * | 12/2002 | Miyagoshi et al. ..... 375/240.24 |
| 2002/0199040 A1 | 12/2002 | Irwin et al. |
| 2003/0014457 A1 | 1/2003 | Desai et al. |

* cited by examiner

YUV 4:2:2 Interlaced
Pixel Pattern 2 x 2

FIG. 12A

| | 0 | | | | | 719 | |
|---|---|---|---|---|---|---|---|
| 31:24 | U(2,0) | V(2,1) | U(0,2) | V(0,3) | UV0 | U(0,716) | V(0,717) | U(0,718) | V(0,719) | E |
| 23:16 | Y(2,0) | Y(2,1) | Y(0,2) | Y(0,3) | Y0 | Y(0,716) | Y(0,717) | Y(0,718) | Y(0,719) | M P |
| 15:08 | U(1,0) | V(1,1) | U(1,2) | V(1,3) | UV1 | U(1,716) | V(1,717) | U(1,718) | V(1,719) | T |
| 07:00 | Y(1,0) | Y(1,1) | Y(1,2) | Y(1,3) | Y1 | Y(1,716) | Y(1,717) | Y(1,718) | Y(1,719) | Y |

FIFO Write Pointer (at position 1)  
FIFO Read Pointer (at position 717)  
102

FIG. 12B

| | 0 | | | | | 641 | |
|---|---|---|---|---|---|---|---|
| 31:24 | G(4,0) | R(4,1) | G(4,2) | R(4,3) | GR4 | G(4,638) | R(4,639) | G(0,640) | R(0,641) | E |
| 23:16 | B(5,0) | G(5,1) | B(5,2) | G(5,3) | BG5 | B(5,638) | G(5,639) | B(1,640) | G(1,641) | M P |
| 15:08 | G(2,0) | R(2,1) | G(2,2) | R(2,3) | GR2 | G(2,638) | R(2,639) | G(2,640) | R(2,641) | T |
| 07:00 | B(3,0) | G(3,1) | B(3,2) | G(3,3) | BG3 | B(3,638) | G(3,639) | B(3,640) | G(3,641) | Y |

FIFO Read Pointer  
FIFO Write Pointer  
102

VIDEO INPUT PROCESSOR IN MULTI-FORMAT VIDEO COMPRESSION SYSTEM

RELATED APPLICATION

This application claims priority under 35 U.S.C. § 119(e) to U.S. Provisional Patent Application Ser. No. 60/309,239, entitled "Video Processing System with Flexible Video Format", filed on Jul. 31, 2001, the subject matter of which is incorporated by reference in its entirety herein.

BACKGROUND OF INVENTION

1. Field of the Invention

This invention relates generally to video data processing, and more particularly, to a video input processor to pre-process different formats of video data including video format conversion, color space conversion, and multiple video input enhancement processing prior to video compression.

2. Description of the Related Art

As digital video applications become increasingly popular, there is a strong demand that video processing technologies be capable of dealing with a wide variety of video data or signals generated from different video sources.

For example, under CCIR (Consultative Committee for International Radio) 601, a NTSC television system outputs interlaced video signals at a resolution of 720×485 pixels with a frame rate of 30 fps (frame per second); a PAL system outputs interlaced video at a resolution of 720×576 pixels with a frame rate of 25 fps. Another common video format is the YUV 4:2:2 interfaced or progressive video, which is typically 8 bit video stream. If the video source is a CMOS sensor, the input video may be in a RGB Bayer format.

Conventional video processing technologies often lack the ability to process different video formats. For example, in the area of digital video compression, conventional techniques can only encode one specific format of video source in most of circumstances. To compress input video in different formats, conventional video compression techniques have to design different hardware or software modules dedicated for processing each different format. For example, if the video compression processor receives RGB Bayer input video, a specially designed hardware device needs to be developed to convert RGB Bayer data into RGB video; if the input is YUV interlaced video data, another specially designed hardware device has to be developed. Such specially designed hardware devices make processing different video data formats very expensive.

Further, conventional video processing technologies fail to provide optimal video encoding methods. For example, in the color space conversion field (i.e., converting RGB data into YCrCb or YUV component video), a conventional algorithm needs 12 clock cycles to complete the conversion process. It is desirable to design a new algorithm that requires fewer clock cycles to process and convert the video data.

In addition, a video input processor in conventional video processing systems does not have functions to enhance video or adapt to video compression needs, such as video filtering and video scaling.

Accordingly, what is needed is a video input processor capable of supporting multiple input video formats in a cost-effective manner and providing optimal algorithm for color space conversion. There is also a need for a video input processor that provides multiple pre-compression processing steps to enhance the video compression.

SUMMARY OF INVENTION

The present invention overcomes limitations and disadvantages of conventional video input processors used in video compression systems. In one embodiment, the present invention provides a video input processor including a format converter and a color space converter.

The video input processor is capable of handling multiple input video formats without the need of extra hardware. The format converter within the video input processor advantageously converts RGB Bayer video signals into GRB 4:1:1 video signals; it also converts YUV (YCrCb) 4:2:2 video signals, both progressive and interlaced video, into the YUV 4:1:1 video signals.

The video input processor further provides color space conversion to convert video data in RGB color space into YUV (or YCrCb) video using fewer clock cycles than the conventional approach.

In additional embodiments, the video input processor performs multiple pre-compression processing steps. The video input processor enhances the input video by filtering high frequencies in input video images. The video input processor also uses scaling and interpolation techniques to adapt to different video output requirements.

The features and advantages described in the specification are not all inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 12A is a representation of the input video data in YUV format stored in the input data buffer of the video input processor;

FIG. 12B is a representation of the input video data in RGB bayer format stored in the input data buffer of the video input processor.

DESCRIPTION OF THE PREFERRED EMBODIMENTS

Reference will now be made in detail to several embodiments of the present invention, examples of which are illustrated in the accompanying drawings. Wherever practicable, the same reference numbers will be used throughout the drawings to refer to the same or like parts.

Note that in describing different video formats, the YUV video format is frequently mentioned and used throughout the specification. It is common knowledge that YUV is a video color model in which luminance information (Y) is separated from chrominance information (U and V). Such YUV video components are often written in a variety of ways: (1) Y, R-Y, B-Y; (2) Y $C_r$ $C_b$ and (3) Y $P_a$ $P_b$, etc. The following description of YUV video should be understood as applied to all compatible and derivative digital video formats.

Figure 1:
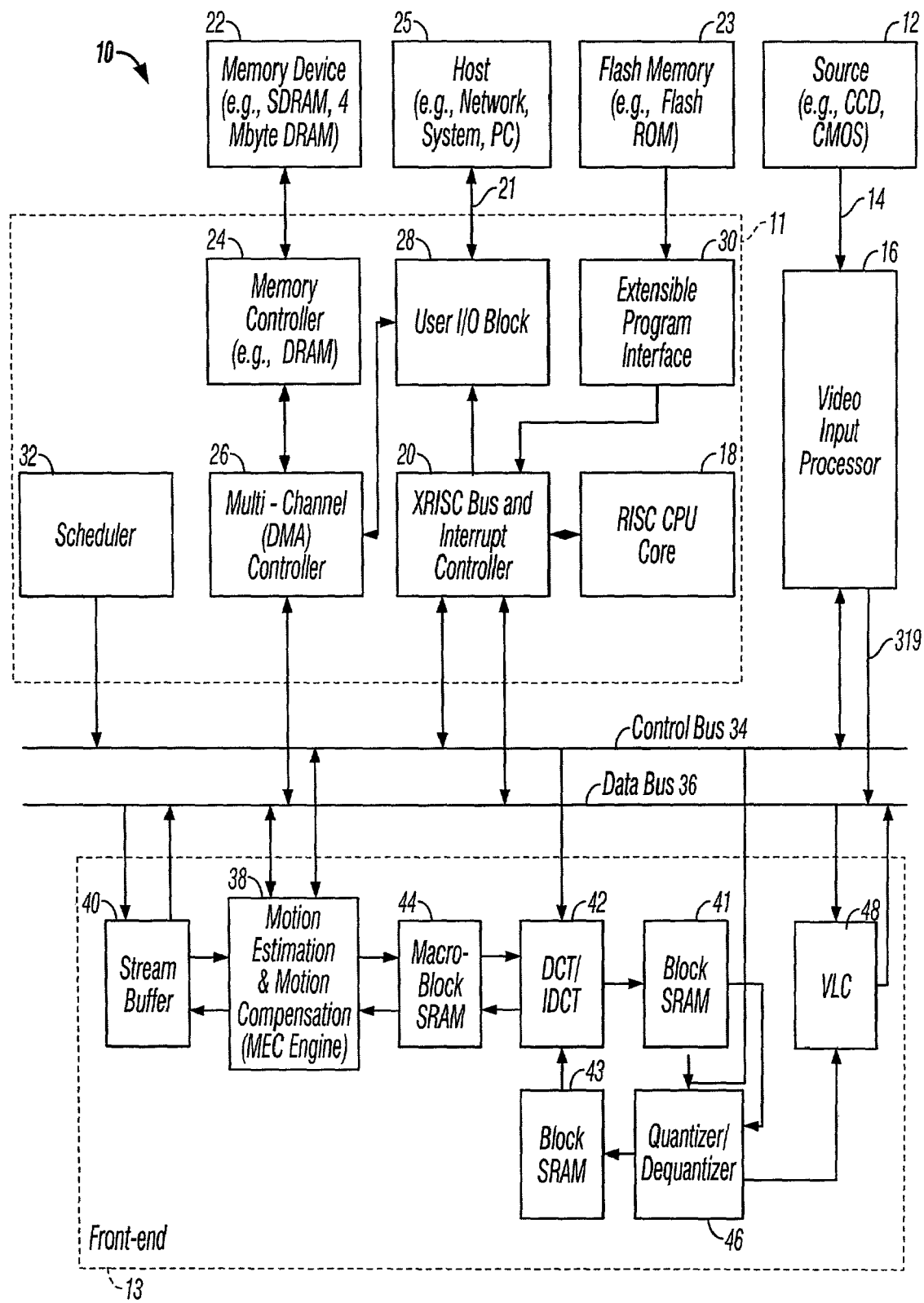
FIG. 1 is a block diagram of an embodiment of a video compression system.

FIG. 1 illustrates a video compression system 10 that may be used to implement the video input pre-compression processing in accordance with one embodiment of the present invention. System 10 includes a processor-based platform 11 (back end 11), a front end 13, a source 12, a video input processor 16, a memory device 22, a flash memory 23, a host 25, a control bus 34 and a data bus 36. Data from the source 12 is received by the video input processor 16. The video input processor 16 is synchronized with a pixel clock PCLK (not explicitly shown), which may be operating at a low frequency, such as 27 MHz. A signal line 14 allows the transfer of pixel data from the source 12 to the video input processor 16. Every clock cycle, a pixel can be input through the signal line 14 with a valid pixel signal. Those skilled in the art will recognize that the input timing can be controlled by the horizontal and vertical synchronize signals.

The source 12 may be a multitude of devices that provide a digitized video bit stream (data stream). One example of a source device includes a Complementary Metal Oxide Semiconductor (CMOS) device or Charge Coupled Device (CCD) sensor like that used in a digital camera and PC camera. Another source device that may work suitably well with the present invention, and included by way of example, is the Philips 711x video digitizer and processor chip. By way of background information, in a digital camera, CCDs can be analogized to operating like film. That is, when they are exposed to light, CCDs record the intensities or shades, of light as variable charges. In the field of digital cameras, the charges are converted to a discrete number by analog to digital converters. It will be recognized that other types of sources capable of generating a digitized video bit stream may work suitably well with the present invention, including sources in the nature of a personal video recorder, a video-graphics capture and processor board, and a digital CAM recorder.

In general, the source 12 generates an uncompressed video data bit stream on the signal line 14, which may be of multiple formats. By way of example, the format of data stream can comply with the CCIR (Consultative Committee for International Radio, now ITU-R) 601 recommendation which has been adopted worldwide for uncompressed digital video used in studio television production. This standard is also known as 4:2:2. Also, the data stream may be formatted according to the parallel extension standard, namely CCIR 656 with PAL and NTSC, which had been incorporated into MPEG as the Professional Profile. CCIR 656 sets out serial and parallel interfaces to CCIR 601. Other suitable video formats include: YUV 4:2:2 interlace; 8-bit YUV with Vsysnc/Hsync/Fodd or Vref/Href format, interlace and progressive; 10-bit RGB Bayer with Vsync/Hsync CMOS sensor format. The support size can vary from 352×288 to 720×480 (30 fps) or 720×576 (25 fps), while the support input frame rate can vary from 10fps to 30fps.

It is noted that these values are provided by way of example, and that the invention is not limited to these formats and parameters, and may work suitably well with other types of formats and parameters. When the data stream includes an audio component, the format of the data stream could also be in IIS (inter IC signal) format. Of course, the appropriate IIS data rates, which typically are at speeds of several Mbits/second, may be selected for transferring audio data. It will be appreciated that CCIR 656 and IIS are only examples of possible digital data formats, and that other formats are equally possible. The video input processor 16 includes necessary ports and circuitry to receive the incoming (video and/or audio) signal and to buffer data from such signal.

The base platform 11 is preferably a general microprocessor-based computing system. In one implementation, the electronics of platform 11 are implemented as a single ASIC incorporating a processor 18, a bus and interrupt controller 20, the memory device 22 (which is shown as being external to platform 11 in FIG. 1), a memory device controller 24, a multichannel (e.g., Direct Memory Access DMA) controller 26, an input/output (I/O) interface 28, an extensible program interface 30 and a scheduler 32. In particular, the processor 18 may be any suitable processor with on-chip memory for encoding sub-sampled video signals, such as an Intel i860 pixel processor, programmed to implement the motion estimation and compensation techniques of the present invention. Preferably through and according to one implementation, the processor 18 is a RISC-based CPU capable of controlling and coordinating the transfer of blocks of data, but not necessarily handling the video processing. This keeps manufacturing costs of system 10 low, which is particularly beneficial when system 10 is utilized in VLSI, ASIC and System-on-Chip (SoC) applications.

By way of example, suitable general parameters for choosing a low cost RISC CPU 18 include a 16-bit arithmetic logic unit (ALU), an 18-bit instruction set, and an operating speed of up to 100 MHz. Exemplary applications suitable for the incorporation of system 10 include digital video recorders, remote video surveillance systems, video capture boxes, small portable handheld devices such as digital cameras, multimedia-enabled cellular phones and personal digital assistants (PDAs), and other media-based devices and appliances. The (XRISC) bus and interrupt controller 20 handles the workflow of the data and control signals for the computing processes of CPU 18, including for example, handling hardware and software interrupts, as well as those I/O signals generated.

The memory device 22 may be any suitable computer memory device for storing picture data, such as a video random access memory (VRAM) or dynamic RAM (DRAM) device, under the control of memory device controller 24. The memory device 22 may be integrated into the platform 11 or located externally thereto. In one embodiment where the memory device 22 is a DRAM, the controller 24 is selected to be a corresponding DRAM controller performing the physical transfers of data between the memory device 22 and the multichannel controller 26. In this embodiment, the controller 26 may be a DMA controller selected to accommodate any suitable number of DMA channels used to transfer the retrieved video data into packed pixel format or planar bit maps, typically from the memory device 22 to each data block for processing by the MEC engine 38.

By way of example, the DMA controller 26 may use 8, 32 or any other number of channels, to transfer data from the DRAM 22 to each data block without necessarily utilizing the processing resources of the CPU 18. In one embodiment, the DMA controller 26 is designed as a two-dimensional controller, operating on at least an instruction of pre-specified length, along with a start command, and source address. The multi-channel DMA controller 26 can include a plurality of channels, each with configuration registers holding information, such as the start address of data, the end address of data, the length of data transferred, type of stop transfer mechanism, and the source address of the data. Alternatively, the multi-channel controller 26 may facilitate the transfer of data from the I/O block 28 to the MEC engine 38, including by way of example, data from a host bus 21 coupled to the I/O interface 28.

The I/O interface 28 couples the system 10 to various external devices and components, referred to as hosts 25, using a variety of data standards and formats. For example, the I/O interface 28 can include an output format along host bus 21 compatible with: a Peripheral Component Interconnect (PCI) bus typically having a wider bandwidth than the traditional ISA bus, and allowing peripherals to transfer data at higher speeds; a Universal Serial Bus (USB) hardware interface for low-speed peripherals such as the keyboard, mouse, joystick, scanner, printer and telephony devices, and also MPEG-1 and MPEG-2 digital video; IIC (inter IC control); and Host Parallel Interface (HPI). These types of ports in I/O interface 28 are only examples of possible port data formats, and other formats are equally possible.

I/O interface 28 can be coupled to a variety of different hosts 25, including for example, PCs, applications supported by network enabled systems, servers, high quality PC video cameras for video conferencing, video recorders, video capture boards for MPEG-1, MPEG2, MPEG-4, H.263 and H.261, IP based remote video surveillance systems, video capture boxes for time shifting purposes, network computing systems, mobile visual communication, wireless communication by MPEG-4 over CDMA, and PDA enabled with multimedia features. Hosts 25 may include driver level transcoding software to convert the compressed stream of data from I/O block 28 into MPEG-1, MPEG-2, MPEG-4, H.263, by way of example.

Extensible program interface 30 enables data to be loaded into the system 10 from a flash memory device 23. A flash memory device 23 typically stores its content without the need for power, and unlike a DRAM, it is a non-volatile storage device. Any number of suitable flash memory 23 devices may be used with the present invention, such as digital film in a PC card, a flash ROM, memory stick formats, and SmartMedia.

The scheduler 32 is coupled to the control bus 34 to provide a timing mechanism for scheduling and enabling activation of components in the system 10. An exemplary scheduler 32 for enabling the scheduling and synchronization of operations and data transfers at specific predetermined times in an operational cycle is disclosed in commonly-assigned copending U.S. patent application Ser. No. 10/033,857, filed on Nov. 2, 2001, entitled "Video Processing Control and Scheduling", by Sha Li, et al., the subject matter of which is herein incorporated by reference in its entirety.

The video input processor 16, the scheduler 32, the bus and interrupt controller 20 and multichannel controller 26 are coupled to one or both of the control bus 34 and the data bus 36. According to one implementation, the data bus 36 is a DMA bus. However, the data bus 36 may be any suitable digital signal transfer device, including an Industry Standard Architecture (ISA) bus, an Extended ISA (EISA) bus, a PCI bus, or a VL bus. When the data bus 36 is a DMA data bus, after initialization and during active capturing of the incoming video signal, the DMA controller 26 requests the DMA bus 36, and after acquiring the bus 36, will perform burst writes of video data to the memory 22 to be described further with the MEC engine 38. In the particular implementation, the data bus 36 is selected to be 36 bits, which is a suitable width for VLSI, ASIC and SoC applications. It will be recognized that overflow handling capability can be designed with the controller 26 in the event that excessive bus latency is experienced.

The front end 13 includes a motion estimation and compensation (MEC) engine 38, a stream buffer 40, a discrete cosine transformer (DCT) and inverse DCT unit 42, a macroblock SRAM 44, buffers such as block SRAMs 41 and 43, a quantizer and dequantizer 46, and a variable length coding (VLC) encoder 48. The DCT/IDCT 42 provides block-based orthogonal transformation of a block of picture elements to a matrix of spatial frequency coefficients in order to reduce spatial redundancy, typically after motion compensation prediction or interpolation. By way of example, the internal accuracy of the DCT/IDCT 42 can be 17 bits, with a DCT output saturated to 8 bits or 12 bits.

One aspect of the DCT/IDCT 42 is to provide a very small error over the ideal floating model, and to reduce the mis-match of decoding function to be as small as possible. The quantizer/dequantizer 46 provides further data compression when mapping the data to a representation that strips away unnecessary information, in general, based on zigzag scans over the macroblock. The macro-block SRAM 44 is a memory device for storing the picture data used by the front end 13. The block SRAMs 41 and 43 are shown as separate modules in FIG. 1, but may be part of the same component, and are generally used to store block data at various stages of the encoding process. Where the MEC engine 38 needs to share on-chip SRAM with other modules (e.g., DCT/IDCT 42), a programmable scheduler may be included to schedule the various processes accordingly.

In FIG. 1, a general block diagram is provided for the DCT/IDCT and quantization and dequantization functionality. Those skilled in the art will recognize that these functions may be provided in a variety of ways. For example, the output of the discrete cosine transformer 42 is quantized. An output of the quantizer 46 can be reconstructed through the inverse quantizer 42, and provided through the inverse DCT 42 for storage in memory, like the macro-block SRAM 44. The general purpose of subjecting the output of the quantizer 46 through inverse quantization and inverse DCT 42 is to detect whether a difference macroblock is lossy. When data is summed with the output of the MEC engine 38 along with dedicated object-based motion prediction tools (not shown) for each object, a lossy version of the original picture can be stored in the SRAM 44. Those skilled in the art will appreciate that motion texture coding, and DCT-based texture coding (e.g., using either standard 8×8 DCT or shape-adaptive DCT) may also be provided with the front end 11. It is noted that the DCT/IDCT 42 and the quantizer/dequantizer 46 not only provide the above functions during the encoding process, but also are capable of emulating a decoder for the reconstruction of frames based on receiving the reference frames along with the motion vectors. To this end, the functional blocks 38–48 are capable of operating as a codec.

The VLC encoder 48 provides lossless coding to assign shorter code words to events occurring frequently and longer code words to events occurring less frequently. The use of a VLC is typically useful for reducing the number of bits used during encoding and video compression of motion data. The transform coefficients are quantized and the quantization label encoded using a variable-length coding.

Those skilled in the art will recognize that the blocks of FIG. 1 are functional blocks that may be implemented either by hardware, software, or a combination of both. Given the functional description of these blocks, those of ordinary skill in the art will be able to implement various components described using well-known combinational and/or sequential logic, as well as software without undue experimentation. Those skilled in the art will recognize that the present invention is not limited to the video compression system described above, but is applicable to any video processing system.

Figure 2A:
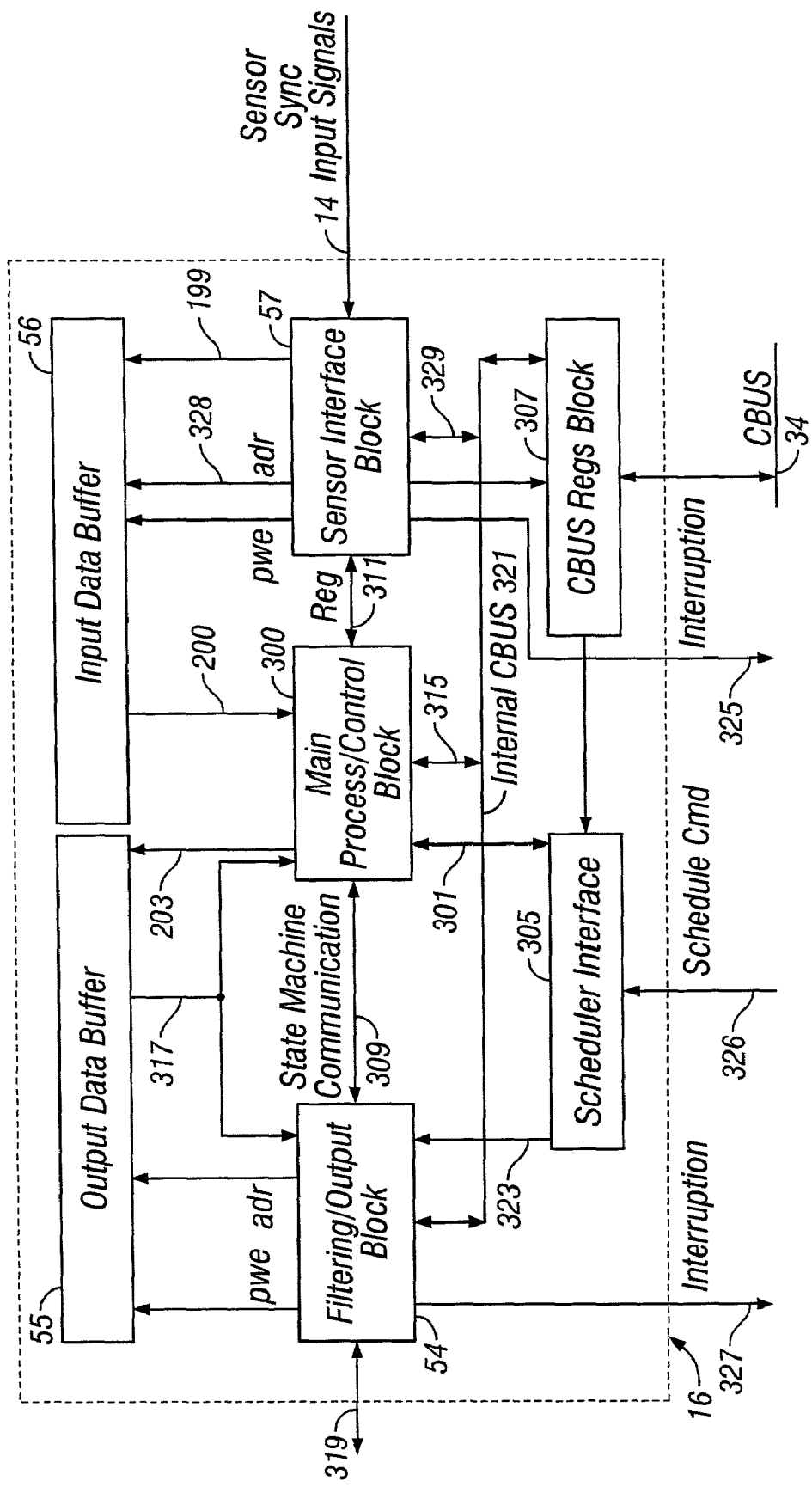
FIG. 2A is a block diagram of an embodiment of a video input processor used in the video compression system in FIG. 1.

Reference is now made to FIG. 2A to further describe an embodiment of the video input processor ("VIP") 16. In the embodiment of FIG. 2A, similar reference numerals are used for common components already described, primarily for convenience.

In accordance with the present invention, the VIP 16 is capable of converting input video signals of different formats into a same format. For the purpose of the description of the present invention, the format refers to a ratio between the different video components of the input video data, e.g., the primary color components, Red, Green or Blue, or the luminance component Y or chrominance components U, V (Cr, Cb). As shown in the table below, irrespective of the video format of the input video generated by the source 12, the VIP 16 uses the same hardware architecture to convert input video of different formats into a similar YUV 4:1:1 format, which is often preferred by most video compression systems. The VIP 16 is also capable of using a plurality of techniques to pre-process the input video signals from the source 12 to achieve desirable output video signals. For example, a preferred embodiment of the VIP 16 can perform sub-windowing, video scaling and video filtering operations upon the input video signals received from the source 12. All these operations can either adapt to video output requirements or lessen the computing burdens in subsequent video compression stage.

| Video input signal received from the source 12 | Video output signal of the VIP 16 |
| --- | --- |
| RGB Bayer | YUV 4:1:1 |
| YUV 4:2:2 interlaced | YUV 4:1:1 |
| YUV 4:2:2 progressive | YUV 4:1:1 |

As shown in FIG. 2A, the VIP 16 includes a sensor interface block 57, a main process/control block ("main block") 300, an input data buffer 56, an output data buffer 55, a filtering/output block 54, a scheduler interface 305 and a CBUS register block 307.

The sensor interface block 57 is coupled to the source 12 through a signal line 14 to receive input video signals. The sensor interface block 57 saves the input video signals into the input data buffer 56 through a signal line 199. The input data buffer 56 is coupled to the main block 300 through a signal line 200. The main block 300 loads the input video signals stored in the buffer 56 via the line 200 and performs pre-compression processing as described below in detail. To output the results of pre-compression processing, the main block 300 is coupled to the output data buffer 55 through a signal line 203 and saves the results into the output data buffer 55. The output of the VIP 16 will eventually be loaded into the filtering/output block 54 via a signal line 317 and be sent to the data bus 36 through a signal line 319. The output of the output data buffer 55 is also sent back to the main block 300 via signal line 317 so that the main block 300 may use the data from the output data buffer 55 to calculate a QY value and to perform scaling functions as described in more detail below.

Corresponding to the data flow as described above, the control of the pre-compression process in the VIP 16 is mainly accomplished through CBUS register block 307 and the scheduler interface 305. The CBUS register block 307 receives control signals from the control bus 34 and also sends information to the control bus 34. Additionally, VIP 16 sends interrupts from the sensor interface block 57 and the filtering/output block 54 on signal lines 325 and 327 respectively to the control bus 34. These interrupt signals are then received from the control bus 34 and processed by the XRISC Bus§ and Interrupt Controller 20. The CBUS register block 307 is also coupled to an internal control bus 321. The sensor interface block 57, the main block 300 and the filtering/output block 54 are all coupled to the internal control bus 321 to receive control information from the CBUS register block 307 as will be further described below.

The scheduler interface 305 is coupled to the scheduler 32 of the system 10 to receive scheduling commands through a signal line 326 from the control bus 34. The scheduler interface 305 is then coupled to the main block 300 via a signal line 301 and coupled to the filtering/output block 54 via a signal line 323 respectively. As will be further described, the scheduler interface 305 will deliver information to the two blocks 300 and 54 dictating time windows for each block's operation.

Internally, the main block 300 is coupled to the sensor interface block 57 via a signal line 311 to read signal-valid information for coordinating its pre-compression processing. The main block 300 also communicates with the filtering/output block 54 through a signal line 309. As will be further described, the main block 300's state machine will send signals to coordinate the operation of a sub-state machine within the filtering/output block 54.

More specifically, the sensor interface block 57 contains a FIFO input address generator block (not shown in FIG. 2A), which directs the input video data to be stored in the input data buffer 56. The FIFO input address generator block can also provide read address via 328 to the main block 300 upon its request, allowing the main block 300 to load the stored video data for processing. The sensor interface block 57 may also send an interruption signal on line 325 to the XRISC Bus and Interrupt Controller 20 in situations such as when the block 57 receives over-speed input pixels from the source 12 or any other conditions as predetermined by the system 10.

Preferably, the sensor interface block 57 is capable of sub-windowing input video signals received from the source 12. The conventional video source 12 often lacks the ability to adjust the image size of the video that it generates. The sensor interface block 57 compensates for this deficiency by enabling image cropping before the input video signals are stored in the input buffer 56. For example, each frame of the input video is in a resolution of 640×480 pixels, but only a smaller area of the video frame, e.g., 500×400 pixels, will be compressed. In this example, the sensor interface 57 scans each row of the input video and only allows the video data corresponding to a selected area to be stored to the buffer 56. The size of the selected area and the starting pixel on the frame are determined by control signals received from the CBUS register block 307. Upon completion of sub-windowing a frame, the sensor interface 57 may notify the CBUS register block 307 via line 329 to increase the frame number to process the next frame. By sub-windowing the input video signals, the VIP 16 enables the video compression system 10 to work with a wide variety of video sources having different video capturing capacity. It also results in a substantial reduction of video data to be compressed.

The input data buffer 56 stores the output of the sensor interface block 57. In one embodiment, the input data buffer 56 is a 4-line SRAM and each line in the buffer 56 is in a size of 8×1024 bytes. Thus, every line stores a complete row of an input video frame. FIG. 12A shows an example of using the buffer 56 to store 2 rows of a YUV 4:2:2 interlaced input. (Y, U and V each will occupy a single line in the buffer 56.) In one approach, the data is input into the buffer 56 under the control of the video FIFO controller in the sensor interface block 57. FIG. 12B exemplifies an example of storing 4 rows of RGB Bayer data in the input data buffer 56. For the RGB Bayer format, it is known that each pixel is represented only by one of the color components Red, Green or Blue.

The data stored in the buffer 56 is further loaded into the main block 300. In a preferred embodiment, the core functions of the main block 300 include video format conversion, color space conversion and video scaling. As will be described in detail, the main block 300 advantageously uses the same hardware configuration to deal with input video signals of different format. As a result, the output of the VIP 16 achieves a uniform video format for the ensuing video compression stage irrespective of the input video format. In accordance with another aspect of the present invention, the main block 300 is also capable of computing important parameters QY that will be used in MEC 38. QY is typically calculated as the average value of a 4×4 block of Y pixels, and will be discussed in further detail below. According to the commonly assigned and co-pending U.S. patent application Ser. No. 09/924,079, entitled "Cell Array and Method of Multiresolution Motion Estimation and Compensation", which is incorporated by reference in its entirety, a preliminary motion vector is determined by searching on a smaller picture size (i.e., subsampled pixels at a size of Q) of an entire video frame. It is useful to provide QY to the MEC engine 38 to facilitate the motion estimation and compensation process.

Figure 12C:
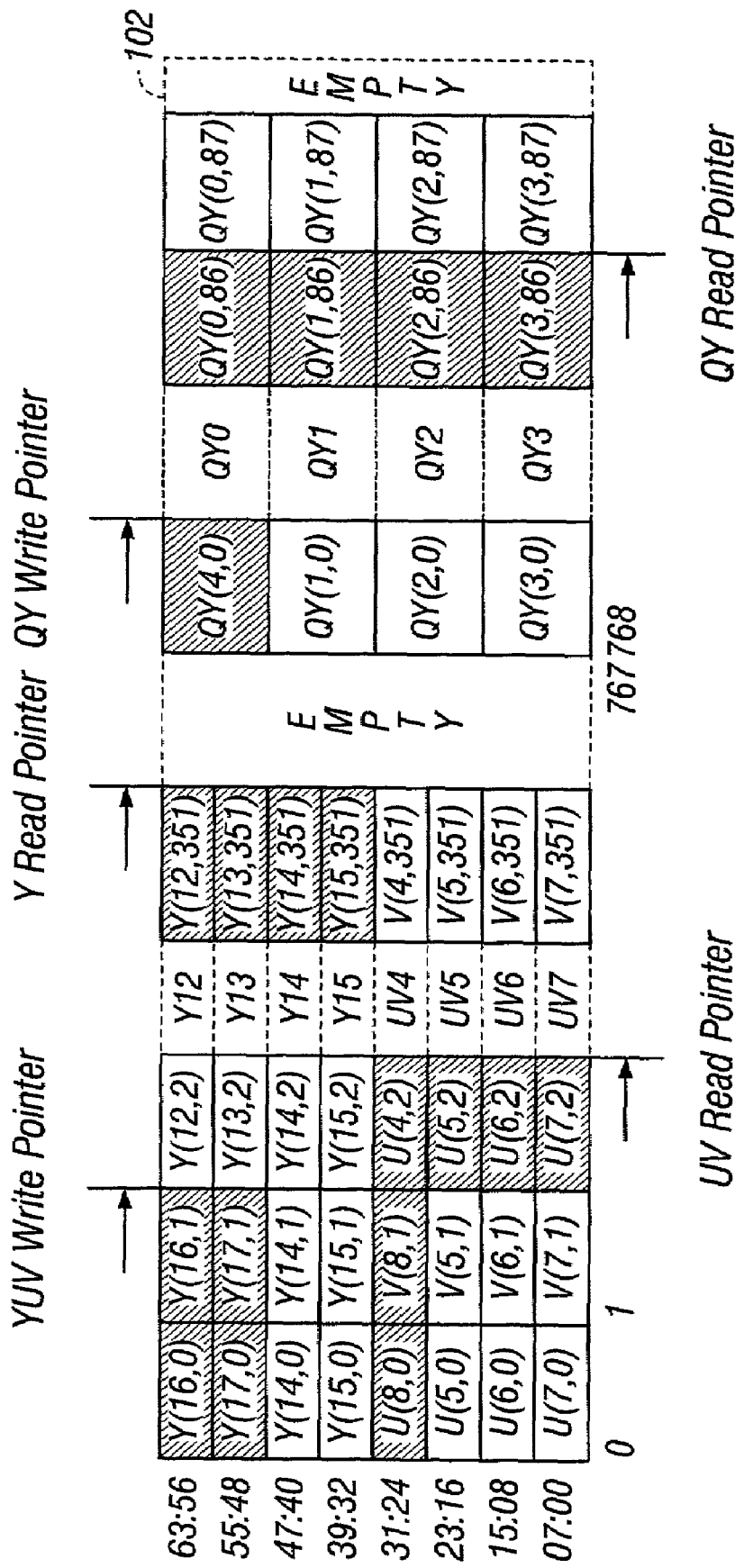
FIG. 12C is a representation of the output video data stored in the output data buffer of the video input processor.

The output of the main block 300 is stored in the output data buffer 55. In one embodiment, the output buffer 55 is a 64×1024 byte buffer with an 8×8 partial write enabled. Each part of the buffer 55 (8b×768) of Y area stores a complete row of output Y (maximum 720 pixels). Each part (8b×768) of UV area stores a complete row of output UV (maximum 720 pixels, interleaved). Each part (16b×256) of QY area stores a complete row of output QY (maximum 180 pixels). FIG. 12C exemplifies an example of the data stored in the output data buffer 55.

The filtering/output block 54 reads data from the output data buffer 55, provides the data to the data bus 36 via 319, which can be received by the memory device 22 under the control of the DMA controller 26. The detail of the control of DMA controller 26 and DMA channels is disclosed in the commonly-assigned copending U.S. patent application Ser. No. 10/033,324, entitled "MULTIPLE CHANNEL DATA BUS CONTROL FOR VIDEO PROCESSING", by Sha Li, et al., the subject matter of which is herein incorporated by reference in its entirety. In a preferred embodiment, the filtering/output block 54 performs filtering operations before the output data is sent to the data bus 36. The filtering/output block 54 can use various video enhancement techniques to process the video data stored in the output buffer 55. For example, the filtering/output block 54 may include low pass filters to remove high frequencies in the input video signals. Such high frequencies are usually hard to compress in video compression stage. By doing so, the filtering/output block 54 may improve the quality of video compression for the video compression system 10.

The CBUS register block 307 contains a plurality of parameter registers, which are programmed by the XRISC 18 to control the VIP 16's behavior. In one implementation approach, there are 16 16-bit parameter registers, providing working mode configuration parameters of the VIP 16. For example, one parameter register corresponds to scheduler setup parameter, which indicates a description of various output tasks of the VIP 16. One set of parameters includes sensor setup parameters, which specify the features of the source 12, such as what kind of video format the source 12 provides, YUV interlace or RGB bayer, etc. These registers may not change for a fixed device system 10 and may be set up only at a boot-up stage.

Another set of the parameters includes video initial configuration parameters, such as a sub-windowing enabling signal and a video scaling enabling signal. These parameters may be changed for different encoding task initializations and may also be set up at the boot-up stage. Other sets of such parameters in the block 307 may include run-time configuration parameters and control signals. These parameters may be changed during an encoding task and as a result, they may be set at any time by the XRISC 18. In addition, the block 307 can also contain control parameters such as sub-windowing starting and finishing positions, and video scaling parameters. To program the registers described above, the XRITSC 18 controls the communication process between the control bus 34 and the registers in the block 307.

The scheduler interface 305 is coupled to the CBUS block 307. During the operation, the scheduler interface 305 selects a task descriptor from a CBUS block 307 register based on a scheduler command, which should indicate an output task of the VIP 16. The scheduler interface 305 then notifies a main state machine, which is preferably located at the main block 300. Such main state machine controls the time information for the different components in the VIP 16. In one implementation, the VIP 16 works in 3 kinds of time domains: the sensor interface block 57 preferably keeps working all the time to process the input video signals; the main block 300 only works during non-output windows, which are assigned by the scheduler 32 through the scheduler interface 305; and the filtering/output block 54 only works at an output time window based on the commands of the scheduler. The detailed description of the scheduling process is disclosed in the commonly-assigned copending U.S. patent application Ser. No. 10/033,857, entitled "Video Processing Control and Scheduling", by Sha Li, et al., the subject matter of which is herein incorporated by reference in its entirety.

Figure 2B:
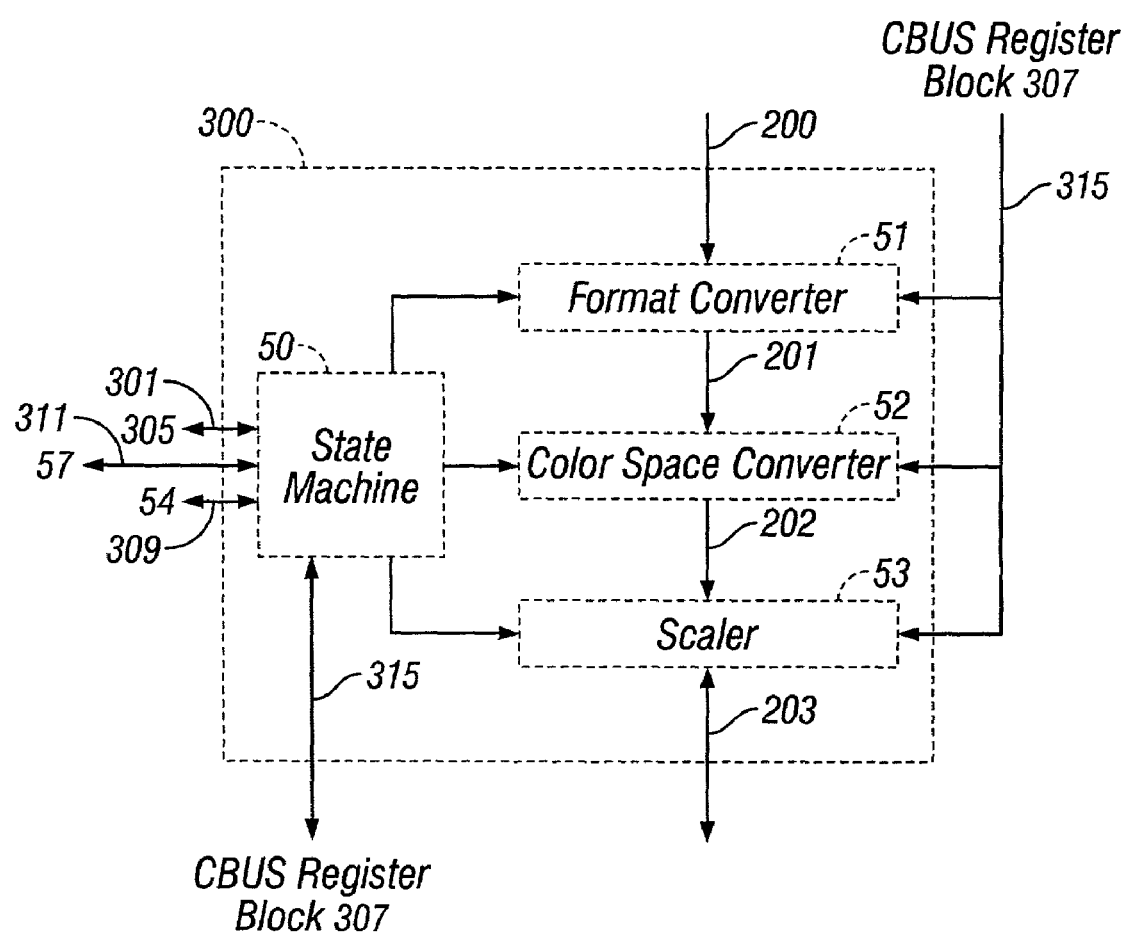
FIG. 2B is block diagram of an embodiment of a main processing block in the video input processor illustrated in FIG. 2A.

FIG. 2B is a block diagram illustrating an embodiment of the main block 300. The main block 300 includes a main state machine 50, a format converter 51, a color space converter 52 and a scaler 53. The main state machine 50 is coupled to the format converter 51, the converter 52 and the scaler 53. To receive control signals from the control bus 34, the main state machine 50 is coupled to the CBUS register block 307 through the signal line 315. The main state machine 50 is also coupled to the scheduler interface 305 through a command line 301 to receive output task information. The main state machine 50 is further coupled to the sensor interface 57 to receive real-time operation status information via the line 311. To coordinate the operation of the filtering/output block 54, the main state machine 50 is also coupled to the filtering/output block 54 to send control signals to a sub-state machine located at the filtering/output block 54.

The format converter 51 is coupled to the input data buffer 56 through the signal line 200 and loads video data from the input data buffer 56 for format conversion. In one preferred embodiment, the format converter 51 handles the conversion from RGB bayer to GBR 4:1:1 format, and de-interlaces the YUV 4:1:1 interlaced signal. The format conversion substantially reduces the amount of video data required to be processed in video compression and also improves the efficiency of the ensuing color conversion process. Deinterlacing helps to generate a YUV 4:1:1 video data based on any input YUV 4:2:2 signal. Such a YUV 4:1:1 video data is preferred by many video compression technologies, e.g., MPEG 1 and MPEG 2, because of its good resolution and data bandwidth. By doing so, the format converter 51 enables the VIP 16 to use a streamlined architecture to cope with multi-format video data and to convert them into preferred digital video format prior to video compression.

The video data after format conversion is subsequently transferred to the color space converter 52 through a signal line 201 for RGB-to-YUV color space conversion under the control of the state machine 50. The color space converter 52 may use a conventional algorithm to complete the RGB-to-YUV processor. In a preferred embodiment however, the color space converter 52 uses a new algorithm to convert RGB video data into YUV 4:1:1 video data as will be described below. If the output of the format converter 51 is already in YUV 4:1:1 format, the video data will not need color space conversion. Under the control of the state machine 50, the YUV video data instead directly passes through the color space converter 52 and is received by the scaler 53 through a signal line 202.

The scaler 53 may be of a conventional nature. Specifically, the scaler 53 may perform horizontal and/or vertical scaling. In a-preferred embodiment, the scaler 53 also handles calculating QY for the use of MEC engine 38. The scaler 53 stores its output through the signal line 203 in the output buffer 55. More specifically, the scaler 53 is adapted to the needs of the VIP 16. The scaler 53 receives control signals from the state machine 50 and the CBUS register block 307 to perform horizontal or vertical scaling operations. The scaling process results in substantial benefits in reducing data computing tasks in the video compression process. For example, the output image size of compressed video only needs to be 320×240 pixels while the image size of the sub-windowed input video is 500×400 pixels. In this situation, the scaler 53 scales the input video data proportionally so that the video compression does not need to process all of the 500×400 pixels on the input video. In one approach, the scaling process is implemented using digitizers to average or filter neighboring pixels or lines with multitap filters.

In another embodiment, the scaler 53 zooms video picture according to actual output requirements. The zooming can be done by doubling or quadrupling pixels and lines producing strong pixelization and jaggies. In another approach, interpolation techniques can be used to interpolate missing pixels by averaging their surrounding pixels. By doing so, the scaler 53 enables the VIP 16 to provide more functions for the entire video compression system 10. Utilizing pixel-doubling, pixel-quadrupling, or interpolation techniques during scaling is known and one skilled in the art will recognize that other scaling techniques may also be used in scaler 53 without exceeding the scope of the present invention.

Still in another embodiment, the scaler 53 computes and outputs a value referred to as QY. The QY is used by the Motion Estimation and Motion Compensation (MEC Engine) 38. As mentioned above, the detailed description of the parameter is described in the U.S. patent application Ser. No. 09/924,079, entitled "Cell Array and Method of Multi-resolution Motion Estimation and Compensation", filed on Aug. 7, 2001, which is incorporated by reference in its entirety. As noted above, QY is calculated as the average value of 16 Y pixels.

Figures 3A, 3B:
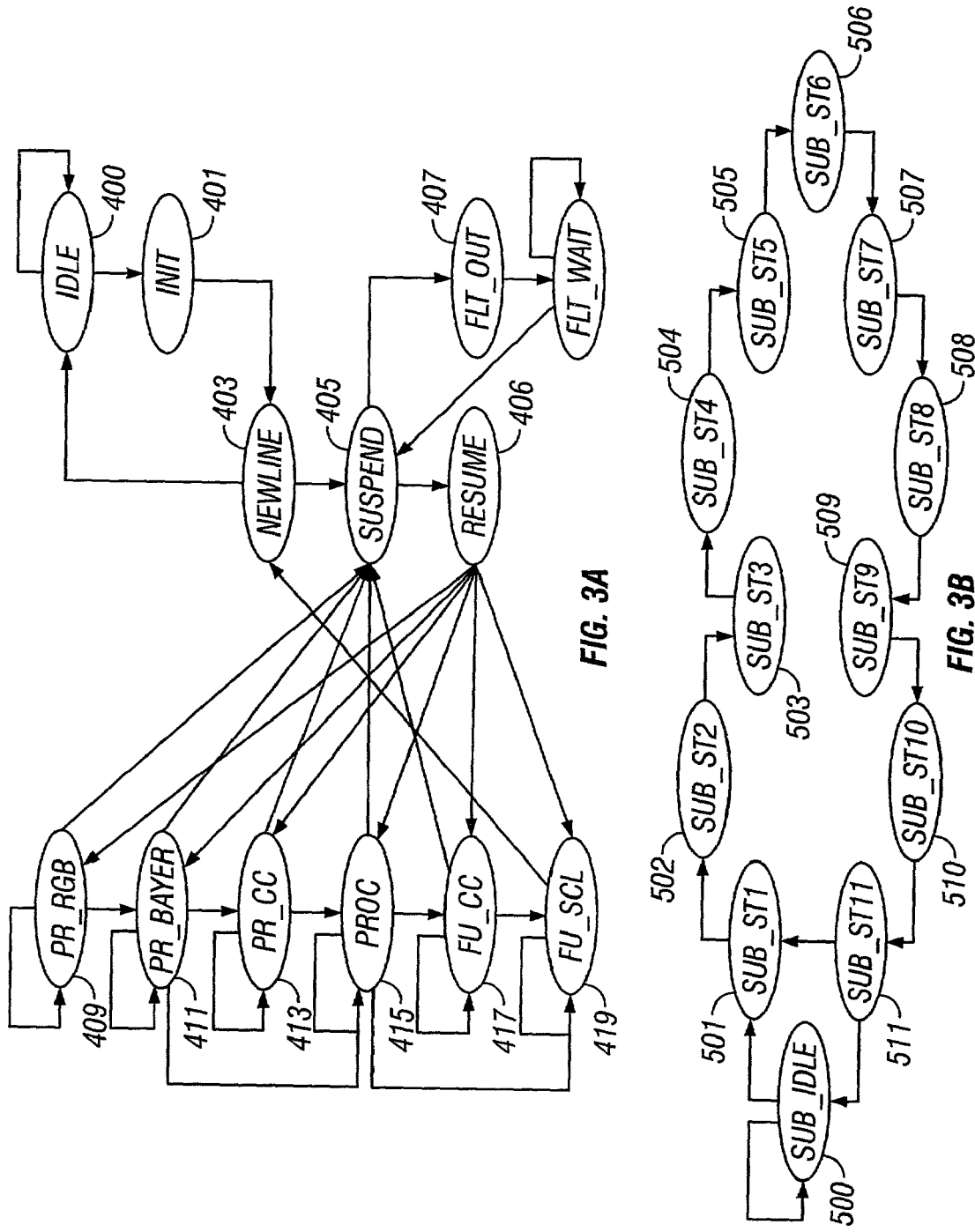
FIG. 3A is a state diagram illustrating the operation of the video input processor.
FIG. 3B is a sub-state diagram illustrating the operation of a format converter of the video input processor.

FIG. 3A is a state diagram illustrating various states used by the main state machine 50 to control the operation of the main block 300. The state machine 50 is placed at an idle state 400 while waiting for an enabling signal from the CBUS register block 307. The state machine 50 initializes the main block 300 after being enabled (state 401). This state may include loading information from corresponding registers at the block 307. The state machine 50 then proceeds to process video data at a new line (state 403). If the scheduler 32 sends a command to the state machine 50 dictating that current state is for output window time, the state machine 50 suspends the operation of the main block 300 (state 405). Simultaneously, the state machine 50 initiates a new state 407 to allow the filtering/output block 54 to process the data currently stored in the output buffer 55. Such state information may be received by the sub-state machine within the block 54 via the signal line 309.

After the output data is filtered and sent to the data bus 36 by the block 54, the state machine 50 resumes the operation of the main block 300 once the scheduler 32 assigns a non-output window time (state 406). During the non-output window time, the state machine 50 issues control signals to the format converter 51, color space converter 52 and scaler 53 to process video data blocks from the input buffer 56. FIG. 3A illustrates a pipeline formed from states 409, 411, 413, 415, 417, and 419. As discussed above, there are three separate functions implemented in one embodiment of the present invention. These functions are format conversion, color conversion and scaling as required by the specific data and output.

Starting on a new line (following the progress of states 403 to 405 to 406 as illustrated in one embodiment), the state machine loads a first block of the video data in state 409. In the next state 411, if the first block requires format conversion, it is converted to GBR 4:1:1 format. In an alternate embodiment, the format converter 51 may be used to convert a YUV 4:2:2 block into YUV 4:1:1. State 411 also loads a second block of video data. If the input video data does not require format conversion, the state machine 50 may skip state 411 and will not instruct the format converter 51 to convert any of the video data.

State 413 loads a third block of video data, format converts the second block of video data as required, and converts the color space of the first block of video data into a YUV 4:1:1 format via color space converter 52. If the first block does not require conversion into YUV 4:1:1 format, then state 413 may be skipped, and the color space converter 52 would not be used.

State 415 represents the state when every required part of the VIP 16 is actively processing a video data block. In one embodiment, this means that data is being loaded, format converted, color space converted, and scaled. Initially, state 415 loads a fourth block of video data, converts the format of the third block as required, converts the color space of the second block and scales the first block via scaler 53 as required. Additionally, a QY value may be generated based on the first block. State 415 is repeated with each successive block moving through the pipeline until the video data is almost completely processed.

When two blocks are left, the state machine 50 may enter state 417. State 417 may be considered a "finish up state" in which the VIP 16 begins to finish processing the data in the pipeline, but does not continue to fill the pipeline. As a result, the format converter 51 is not needed and may be disabled. At this point, no additional data is loaded, and no further blocks are format converted. Assuming there are n blocks in the video data, with the nth block being the final block, then in state 417 the n−1 block is scaled while the nth block is color converted. The state machine 50 then transitions to a second "finish-up" state 419 where the nth block is scaled and the state machine 50 transitions back to state 403 to begin a new line as required.

Note that during the above-described states 409–419, the state machine 50 may suspend each state when the output time window starts and may resume each state when the non-output time window starts. During the output window, the state machine 50 may send a control signal to transfer the scaled data to be stored into the output buffer 55. As discussed above, this data may also be filtered.

Figure 3C:
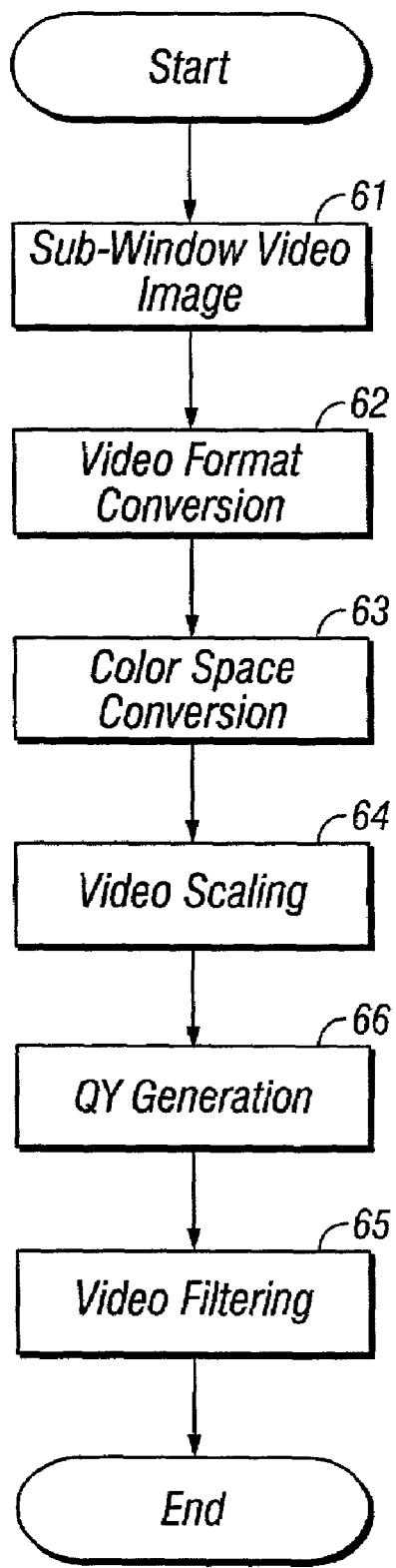
FIG. 3C is a flow chart showing a method for pre-processing input video data of the video compression system in accordance with the present invention.

FIG. 3C is a flow chart illustrating an embodiment of pre-compression steps performed by the VIP 16 in accordance with the present invention. The steps illustrated in FIG. 3C occur for each block of data. When the VIP 16 receives the input video signal, the input video signals are 61 cropped and then stored in the input buffer 56. This results in a substantial reduction of video data to be compressed. After sub-windowing video data, the video data stored in the buffer 56 is loaded into the format converter 51 for video format conversion 62. As mentioned above, the input RGB Bayer format is converted into 4(G) 1(R) 1(B); the input YUV 4:2:2 interlaced video data will be converted into YUV 4:1:1 format; the interlaced YUV input video is also de-interlaced; and the YUV 4:2:2 progressive input video is converted into YUV 4:1:1 video.

If the video data output by the format conversion 62 is still in RGB format, the RGB video data is converted 63 into YUV color space. As described below in detail, a method is provided in the color space converter 52 to simplify the conventional color space conversion algorithm. As a result, the present invention effectively improves the efficiency of the color space conversion and reduces the hardware or software implementation requirements.

The video data in YUV color model may be further enhanced or changed according to the needs of video compression or output requirements. The video scaling step 64 is provided to scale the output video images to a smaller size. In an alternate embodiment, the scaling step 64 provides for zooming video picture on playback.

In accordance with the present invention, there is also provided a step 66 of generating the special value QY for motion estimation and compensation. As mentioned above, the detail of the use of the QY is described in the U.S. patent application Ser. No. 09/924,079, entitled "Cell Array and Method of Multiresolution Motion Estimation and Compensation", which is incorporated herein by reference in its entirety.

Further, a video filtering step 65 reduces sharp edges in any input video images to improve the quality of the video images. The processed video data will have a lower SNR (signal noise ratio) so that the following video compression can be more efficiently performed.

Figure 4:
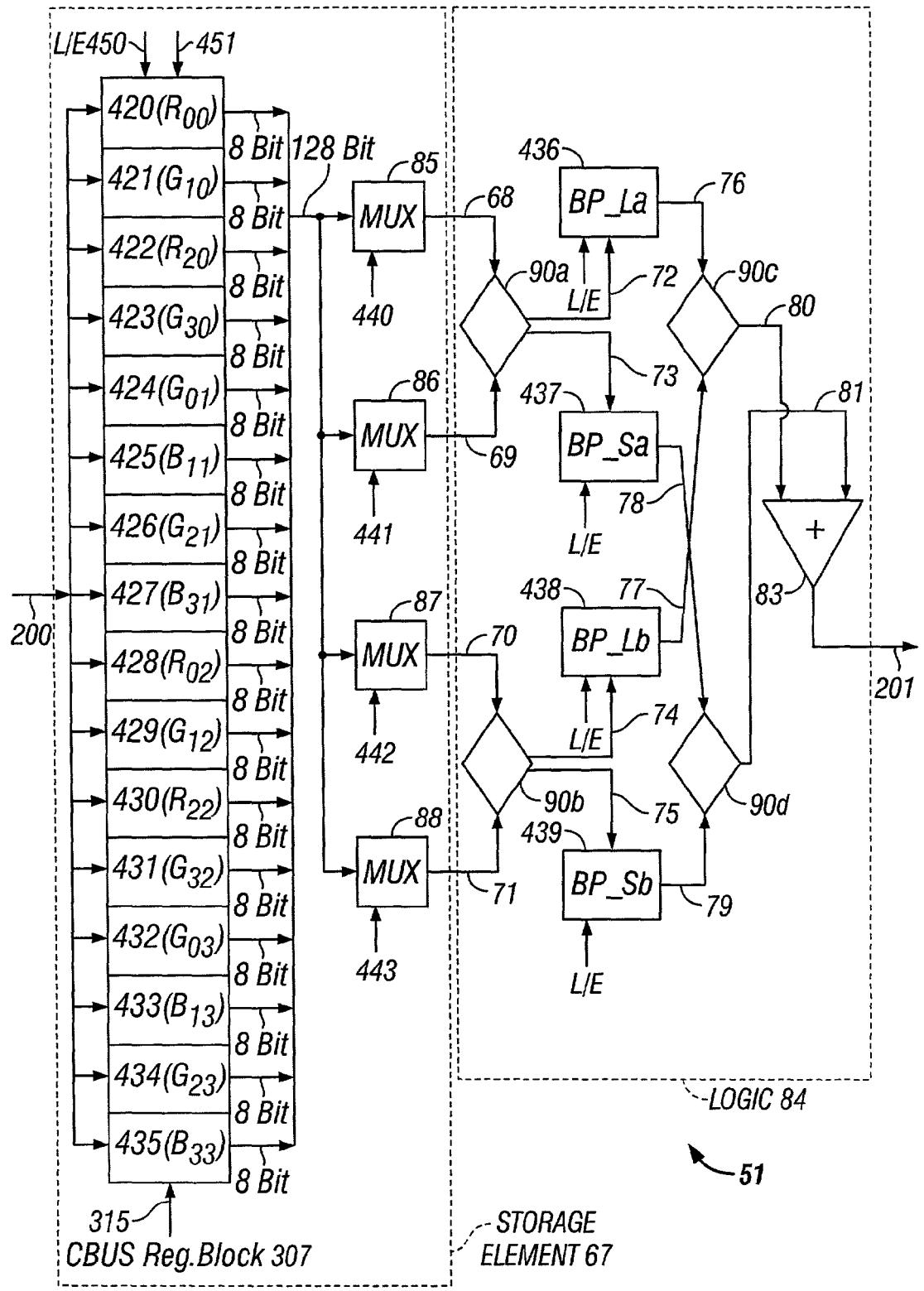
FIG. 4 illustrates an embodiment of a format converter for converting video format for the video input processor.

FIG. 4 now illustrates an embodiment of the format converter 51. The format converter 51 includes a storage element 67 and a logic element 84. In one embodiment, the storage element 67 includes 16 data registers 420–435 to store data loaded from the input data buffer 56. The storage element 67 also includes 4 multiplexers (MUXS) 85–88 coupling the data registers 420–435 with the logic 84. The logic 84 includes comparers 90a, 90b, 90c and 90d, comparison registers BP_La 436, BP_Sa 437, BP_Lb 438, BP_Sb 439, and a mean generator 83. The four comparers 90a–90d, registers 436–439 and the mean generator 83 receive data from the storage element 67 and operate to perform format conversion as described below.

As an example, in FIG. 4, registers 420–435 store data for 16 RGB Bayer pixels. Each register stores 8 bits of data. As mentioned above, each pixel is represented by one of the color components, R, G or B in a typical RGB bayer pixel pattern. The data stored in the registers 420–435 is loaded from the data buffer 56 through the signal line 200 and will be selectively transferred to the logic 84 through the MUXS 85–88.

In particular, each of the registers 420–435 is coupled to the MUXS 85–88 through an 8-bit wide signal line. Thus, the overall data input to each MUX 85–88 is concatenated 128-bit wide data stream. As will be described below, at an operational sub-state of the format converter 51, each MUX 85, 86, 87, 88 will receive a control signal to select a portion of the 128-bit data stream corresponding to one of data registers 420–435 to enter the logic 84 for processing.

To receive data from the registers 420–435, the logic 84 has four inputs 68–71 coupled to the MUXS 85–88 respectively. Specifically, the inputs of the comparer 90a and 90b are respectively coupled to the four MUX 85–88. As shown in FIG. 4, the input 68 of the comparer 90a is coupled to the MUX 85 and the input 69 coupled to the MUX 86. The input 70 of the comparer 90b is coupled to the MUX 87 and the input 71 of the comparer 90b coupled to the MUX 88.

Further, within the logic 84, the register BP_La 436's input is coupled to the comparer 90a's output 72 and the BP_Sa 437's input is coupled to the comparer 90a's output 73. In one embodiment, the BP_La 436 stores the data that is larger between the inputs 68 and 69 and the BP_Sa 437 stores the data that is smaller. Likewise, a first output 74 of the comparer 90b is coupled to the register BP_Lb 438 and a second output 75 of the comparer 90b is coupled to the input of the register BP_Sb 439. In one embodiment, the BP_Lb 438 stores the larger value between the inputs 70 and 71 and the BP_Sb 439 stores the smaller value.

Still referring to the logic 84 in FIG. 4, the BP_La 436 is coupled to a first input of the comparer 90c through a signal line 76 and the BP_Lb 438 is coupled to the comparer 90c's second input through a signal line 77. The comparer 90d's two inputs are respectively coupled to the BP_Sa 437 and the BP_Sb 439 through signal lines 78 and 79. The comparers 90c and 90d's outputs 80 and 81 are respectively coupled to the mean generator 83. The output of the mean generator 83, i.e., the output of the logic 84, is coupled to the color space converter 52 through the signal line 201.

With respect to control signals received by the format converter 51, FIG. 4 shows that the storage element 67 receives a control signal from the CBUS register block 307 via line 315, a latch signal from the state machine 50 via line 450, and other control signals, including any necessary parameters from the parameter register from the state machine 50 via line 451.

The control signal from the CBUS register block 307 may contain information from its parameter registers such as (1) whether the input data from the buffer 56 is YUV or RGB; (2) whether the video data is YUV interlaced or progressive; and (3) whether the RGB Bayer video is in a data block of GB, GR, BG, or RG.

The state machine 50 sends latch signals to the registers 420–435 to load data from the input data buffer 56 to the registers 420–435. The addresses of the data can be provided by the sensor interface 57 via 311. Other control signals from the state machine 50 includes signal indicative of sub-states that are used to perform each step of format conversion as illustrated below in more detail. The control signals from the state machine 50 may also include signals indicative of block information of the input video signals, e.g., whether a YUV interlaced block starts from an even or an odd double-line.

To determine which of the 16 RGB Bayer pixels in registers 420–435 are sent to the logic 84, the MUXS 85–88, each of which is coupled to all of the 16 data registers 420–435, receive control signals 440–443 respectively from the state machine 50 to select data. In one example, the MUX 85 receives the control signal 440, which indicates a register from 420–430 that should send data to the comparer 90a through the input 68. As will be further described below, the control signals 440–443 enable a selection of different combinations of input video data to perform the format conversion, including RGB bayer processing and YUV deinterlacing.

According to the present invention, the logic 84 implements an algorithm of the format conversion. In one embodiment, the logic 84 is a mix of low pass and high pass filters. The logic 84 compares the data value on the four inputs 68–71 selected by the MUXS 85–88 to filter out the highest and the lowest value of the input video data. The remaining intermediate values are averaged to generate an output of the logic 84. In other words, the logic 84 is designed to implement a function $f(a, b, c, d)=(b'+c')/2$, where $\{a', b', c', d'\}$ is rearranged from $\{a, b, c, d\}$ meeting the condition $a'>=b'>=c'>=d'$ or $a'<=b'<=c'<=d'$. The variables a, b, c and d in the function f correspond to the data on respective inputs 68, 69, 70, and 71. The variables b', c' correspond to the inputs 80 and 81 that are coupled to the mean generator 83. The output of the format converter 51 corresponds to the result of the function f, i.e., the value of $(b'+c')/2$.

Note that the four inputs 68–71 are used to illustrate the process in FIG. 4, which correspond to the four variables a, b, c and d in the function f. This does not limit the number of variables in the function f. Nor does it limit the logic 84 to selecting only four inputs. Alternate embodiments may contain more than 4 inputs to generate an output by comparing the input video data and generating an average value of the intermediate values of the input video data.

By way of example exemplifying an implementation of the function f through the logic 84, consider four pixel values D0, D1, D2, and D3, where D0>D1>D2>D3. The comparer 90a compares the first two video pixels, e.g., D0 and D1, received on the inputs 68 and 69 and outputs the greater one between D0 and D1 for storage in the register BP_La 436 and outputs the smaller one to the register BP_Sa 437. Assuming D0 is greater than D1, the BP_La 436 stores D0 and BP_Sa 437 stores D1. The comparer 90b compares the remaining two video pixels on inputs 68 and 69, e.g., D2, D3, and then outputs the greater number to the register BP_Lb 438 and the smaller one to the register BP_Sb 439. Assuming D2 is greater than D3, the BP_Lb 438 stores D2 and the BP_Sb 439 stores D3. Further, the comparer 90c compares D0 and D2 upon receiving data from its inputs 76 and 77. Assuming D0 is greater than D2, the smaller of the two inputs 76 and 77, D2, is sent to the mean generator 83 through the output 80. The comparer 90d compares D1 and D3 upon receiving data from its inputs 78 and 79. Assuming D1 is greater than D3, the greater of the two inputs 78 and 79, D1, is output to the mean generator 83. The mean generator 83 therefore generates an average value of the inputs 80 and 81, i.e., the average of D1 and D2.

Note that in the case where any input data to be compared by the comparers 90a–90d are equivalent, the comparers 90a–90d may be configured to select any of the equivalent inputs as its outputs to registers 436–439 or the mean generator 83.

To exemplify the video format conversion in more detail, FIGS. 6A–6D, 7A–7B and 8A–8B will be now used to describe several examples of performing a video format conversion.

Figure 6A:
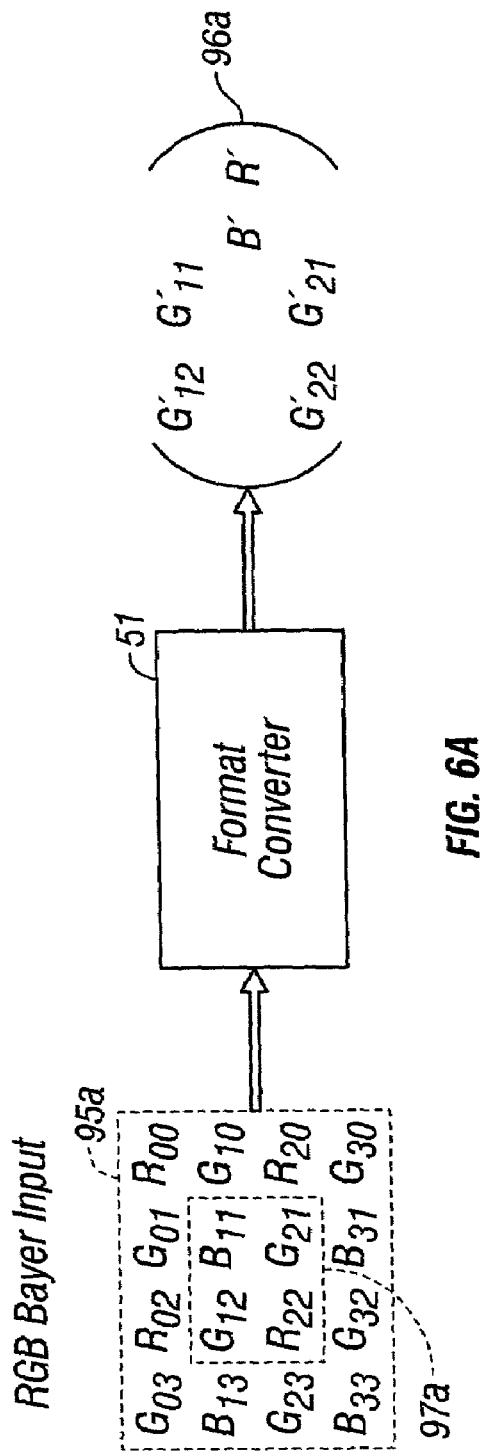
FIG. 6A is a graphic representation of the inputs and outputs for converting RGB Bayer video (GB data pattern) into RGB video data in a format of 4(G) 1(B) 1(R) using the format converter of the present invention.

FIG. 6A graphically illustrates an example of converting RGB Bayer pixel data in GB data pattern into 4(G):1(B):1(R) video data. As shown in FIG. 6A, a 2×2 RGB Bayer pixel data block 97a is to be converted into a GRB 4:1:1 format. In one approach, to obtain the G(4):B(1):R(1) ratio, a 4×4 RGB Bayer pixel block 95a is loaded from the input data buffer 55 and stored in the registers 420–435 of the format converter 51. For the RGB Bayer pixel block 95a, each pixel is represented by a Green, Red or Blue component. As shown in FIG. 6A, a new GRB 4:1:1 data set is generated out of the RGB Bayer data. In one approach, the format converter 51 generates the 4(G)1(B)1(R) as follows:

$$G'_{12}=f(G_{12}, G_{12}, G_{12}, G_{12})=G_{12}; \quad (1)$$

$$G'_{11}=f(G_{12}, G_{21}, G_{10}, G_{01}); \quad (2)$$

$$G'_{22}=f(G_{12}, G_{21}, G_{32}, G_{23}); \quad (3)$$

$$G'_{21}=f(G_{21}, G_{21}, G_{21}, G_{21})=G_{21}; \quad (4)$$

$$B'=f(B_{11}, B_{11}, B_{13}, B_{31}); \quad (5)$$

$$R'=f(R_{22}, R_{22}, R_{20}, R_{02}). \quad (6)$$

As understood above, the variables in the function f are selected from the registers 420–435. Each result in the above (1)–(6) is an output of the format converter 51 in response to the inputs from the registers 420–435.

In one preferred embodiment, to perform the format conversion in (1)–(6), the state machine 50 may use 11 sub-states to complete the format conversion for the block 95a. With reference to the sub-state diagram in FIG. 3B, there is illustrated an 11-state process for the format conversion. In the sub-idle state 500, the format converter 51 waits until it receives a control signal from the state machine 50 to enable format conversion. In sub-state 501, the format converter 51 reads setup control information from the CBUS register block 307 and from the state machine 50. In sub-state 502 and 503, the registers 420–435 are controlled by latch enable signals from the state machine 50 to load data from the input data buffer 56. For example, in the sub-state 502, $R_{00}$, $G_{10}$, $R_{20}$, $G_{30}$, $G_{01}$, $B_{11}$, $G_{21}$ and $B_{31}$ are respectively loaded into the registers 420–427; in the sub-state 503, $R_{02}$, $G_{12}$, $R_{22}$, $G_{32}$, $G_{03}$, $B_{13}$, $G_{23}$ and $B_{33}$ are respectively loaded into the registers 428–435.

After the data of the block 95a is loaded into the registers 420–435, the function f as shown in (1)–(6) will be performed in each of the sub-states 504–507 to generate the desired value. More specifically, in the sub-state 504, to generate $G'_{12}$ according to formula (1), the MUXS 85–88 receive control signals from the state machine 50, which dictate selecting data $G_{12}$ as the input on all signal lines 68–71. As a result, the operation of the logic 84 will generate a $G'_{12}$ on the output 201, which should equal $G_{12}$ based on the above description of the algorithms implemented by the logic 84.

In the sub-state 505, to calculate $G'_{11}$, as shown in (2), the state machine 50 dictates that $G_{12}$, $G_{21}$, $G_{10}$ and $G_{01}$ are selected from the data registers 429, 426, 421, 424 respectively through the MUXS 85–88. The logic 84 thus receives the four inputs $G_{12}$, $G_{21}$, $G_{10}$ and $G_{01}$ and compares them according to the operation of function f. By way of example, if $G_{12}$ is the maximum and $G_{01}$ is the minimum among the four, inputs, $G'_{11}$ will be the average of $G_{21}$ and $G_{10}$ and output on the signal line 201.

In a similar process, $G'_{22}$, $G'_{11}$, B' and R' can be respectively generated in the sub-states 506–509 by selecting data from corresponding registers and performing the function f. By doing so, the input RGB Bayer video data in GB pattern is successfully converted into GBR4:1:1 video data, i.e., $G'_{12}$, $G'_{11}$, $G'_{22}$, $G'_{21}$, B' and R'. In other words, each pixel on the input 2×2 pixel block 97a is now represented by the video format 4($G'_{12}$, $G'_{11}$, $G'_{22}$, $G'_{21}$,)1(B')1(R') pixel data 96a.

In addition, as a benefit provided by the present invention, the format converter 51 can also compute an average of Green components of the RGB Bayer or RGB data. Using the above example in FIG. 6A, in the sub-state 510, the format converter 51 generates an averaged G' by selecting four inputs $G_{12}$, $G_{12}$, $G_{21}$, $G_{21}$ from the registers 429 and 426, and performing the function f:

$$G'=f(G_{12}, G_{12}, G_{21}, G_{21})=(G_{12}+G_{21})/2 \quad (7)$$

As will be discussed in greater detail below, the average value G' of Green color components in RGB data pattern benefits the process of converting RGB color space into YUV color space. The derived G' in the format converter 51 will reduce calculations that are needed in conventional algorithm. Thus, the VIP 16 obtains more efficient performance in its color space conversion.

Figure 6B:
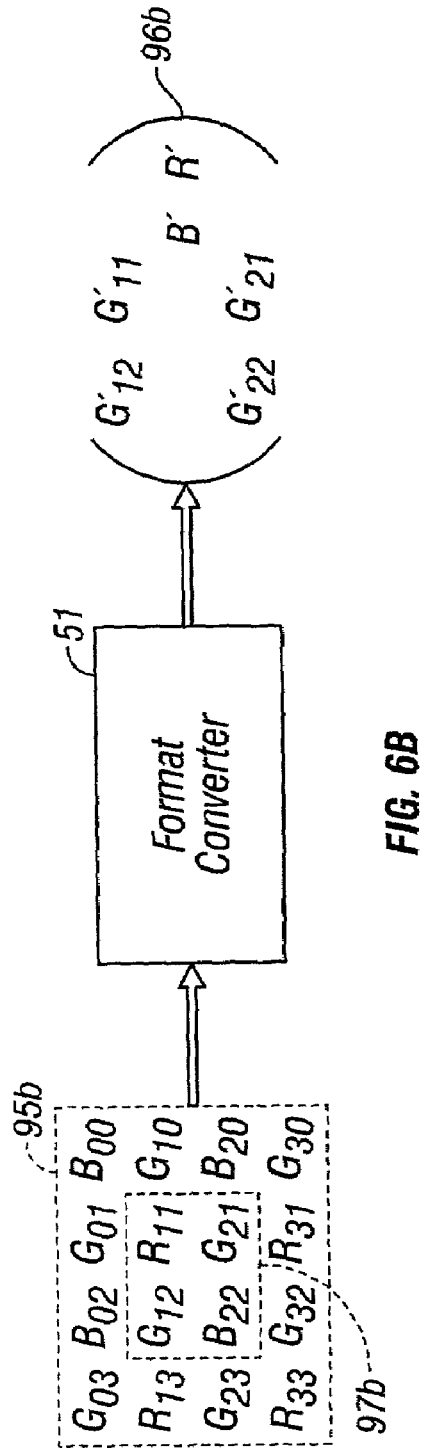
FIG. 6B is a graphic representation of the inputs and outputs for converting RGB Bayer video (GR data pattern) into RGB video data in a format of 4(G) 1(B) 1(R) using the format converter of the present invention.

Similarly, the format converter 51 may convert other data patterns of RGB Bayer video data into a GBR 4:1:1 format, such as GR, BG and RG data pattern. FIG. 6B shows an example of converting RGB Bayer pixel data in GR data pattern 97b into 4(G):1(B):1(R) video data.

To generate the 4(G):1(B):1(R) video data, the format converter 51 is configured to select proper inputs and perform the function f as follows:

$$G'_{12}=f(G_{12}, G_{12}, G_{12}, G_{12})=G_{12}; \quad (8)$$

$$G'_{11}=f(G_{12}, G_{21}, G_{10}, G_{01}); \quad (9)$$

$$G'_{22}=f(G_{12}, G_{21}, G_{32}, G_{23}); \quad (10)$$

$$G'_{21}=f(G_{21}, G_{21}, G_{21}, G_{21})=G_{21}; \quad (11)$$

$$B'=f(B_{22}, B_{22}, B_{02}, B_{20}); \quad (12)$$

$$R'=f(R_{11}, R_{11}, R_{13}, R_{31}). \quad (13)$$

By selecting the variables a–d in function f as shown in the formula (8)–(10), the $G'_{12}$, $G'_{11}$, $G'_{22}$, $G'_{21}$, B', R' are generated in each sub-state as dictated by the state machine 50. The outputs of the format converter 51 will then be used to represent the data pixels in the pixel block 97b.

Figure 6C:
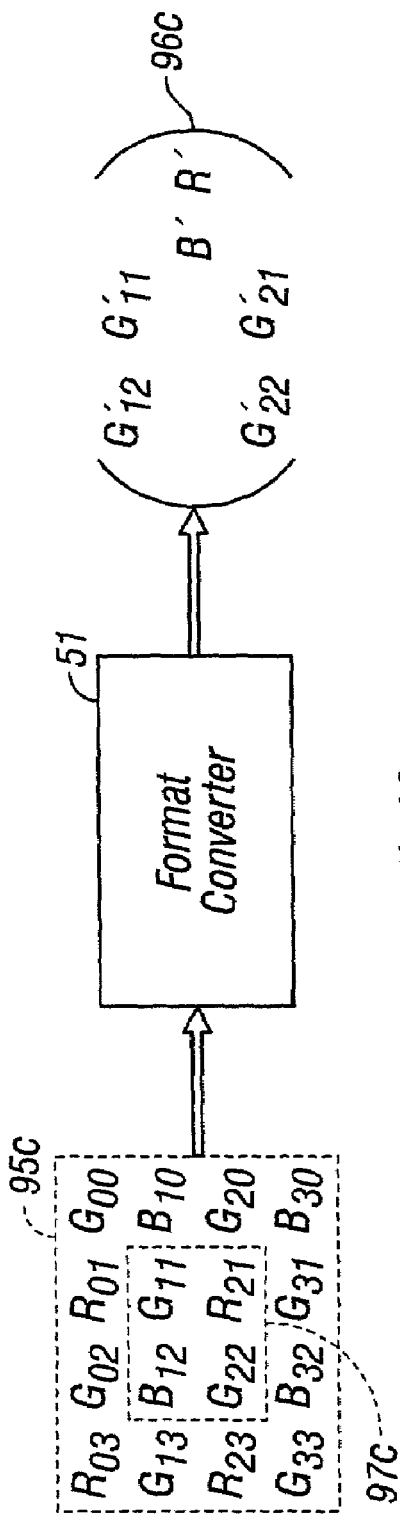
FIG. 6C is a graphic representation of the inputs and outputs for converting RGB Bayer video (BG data pattern) into RGB video data in a format of 4(G) 1(B) 1(R) using the format converter of the present invention.

FIG. 6C is a graphic representation of converting RGB Bayer pixel data in BG data pattern 97c into 4(G):1(B):1(R) video data.

To generate the 4(G):1(B):1(R) video data, the format converter 51 is configured to select proper inputs and perform the function f as follows:

$$G'_{12}=f(G_{02}, G_{13}, G_{22}, G_{11}); \quad (14)$$

$$G'_{11}=f(G_{11}, G_{11}, G_{11}, G_{11})=G_{11}; \quad (15)$$

$$G'_{22}=f(G_{22}, G_{22}, G_{22}, G_{22})=G_{22}; \quad (16)$$

$$G'_{21}=f(G_{11}, G_{22}, G_{31}, G_{20}); \quad (17)$$

$$B'=f(B_{12}, B_{12}, B_{10}, B_{32}); \quad (18)$$

$$R'=f(R_{21}, R_{21}, R_{01}, R_{23}). \quad (19)$$

Again, by receiving proper inputs as shown in (14)–(19), the format converter 51 performs the function f at each state. Its output, the $G'_{12}$, $G'_{11}$, $G'_{22}$, $G'_{21}$, B', R', will then be available for representing the data pixels in the pixel block 97c.

Figure 6D:
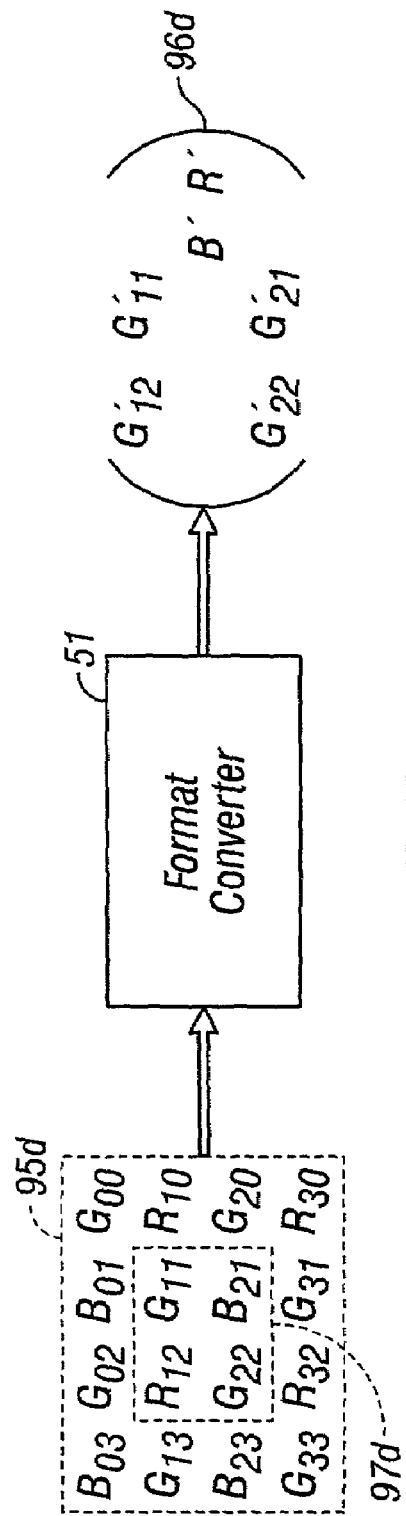
FIG. 6D is a graphic representation of the inputs and outputs for converting RGB Bayer video (RG data pattern) into RGB video data in a format of 4(G) 1(B) 1(R) using the format converter of the present invention.

FIG. 6D is a graphical representation of an example of converting RGB Bayer pixel data in BG data pattern 97d into 4(G):1(B):1(R) video data.

To generate the 4(G):1(B):1(R) video data, the format converter 51 is configured to select proper inputs and perform the function f as follows:

$$G'_{12}=f(G_{02}, G_{13}, G_{22}, G_{11}); \quad (20)$$

$$G'_{11}=f(G_{11}, G_{11}, G_{11}, G_{11})=G_{11}; \quad (21)$$

$$G'_{22}=f(G_{22}, G_{22}, G_{22}, G_{22})=G_{22}; \quad (22)$$

$$G'_{21}=f(G_{11}, G_{22}, G_{31}, G_{20}); \quad (23)$$

$$B'=f(B_{21}, B_{21}, B_{01}, B_{23}); \quad (24)$$

$$R'=f(R_{12}, R_{12}, R_{10}, R_{32}). \quad (25)$$

By doing so, the data corresponding to $G'_{12}$, $G'_{11}$, $G'_{22}$, $G'_{21}$, B', R' are generated to represent the data pixels in the pixel block 97d.

The examples in FIGS. 6A–6D show that the format converter 51 is capable of performing operations on different data patterns of RGB Bayer video and deriving the same GBR4:1:1 video using the same hardware. The description below continues to discuss the format conversion for other video formats.

Figure 7A:
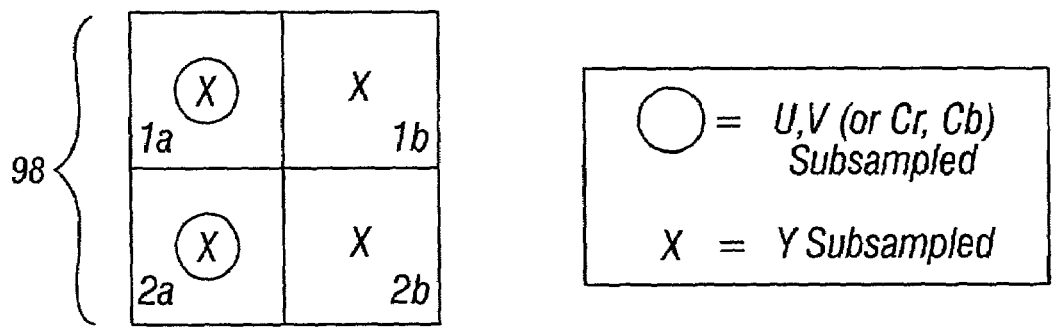
FIG. 7A is a graphical representation of a YUV 4:2:2 progressive pixel pattern.
Figure 7B:
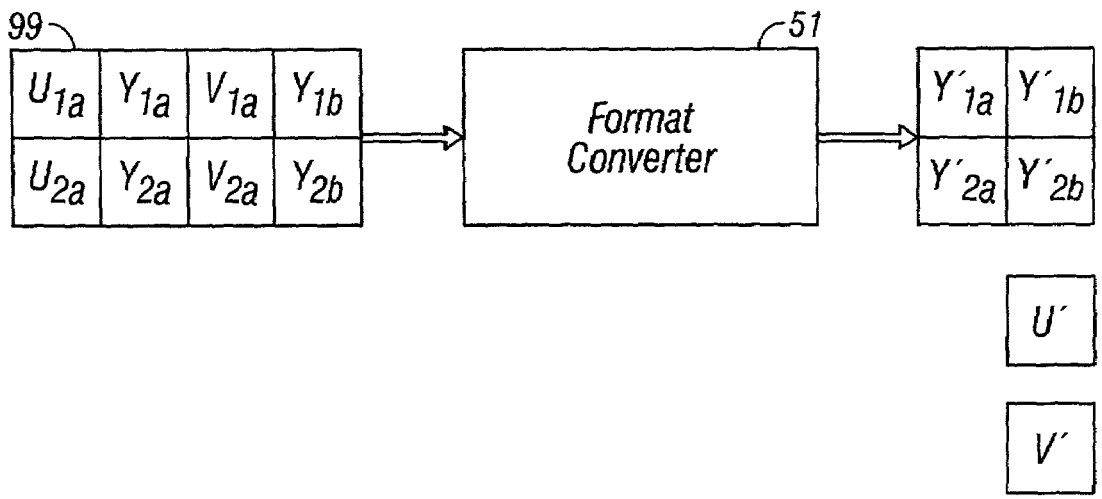
FIG. 7B is a graphical representation of the inputs and outputs for converting a YUV 4:2:2 progressive pixel data signal into a YUV 4:1:1 video data signal.

FIGS. 7A and 7B illustrate an example of using the format converter 51 to convert YUV 4:2:2 progressive video data into YUV 4:1:1 format. As mentioned above, the format converter 51 is also capable of converting YUV 4:2:2 into YUV 4:1:1 and deinterlacing YUV 4:2:2 interlaced video.

As shown in FIG. 7A, the 2×2 pixel pattern 98, including the pixels 1a, 1b, 2a and 2b, corresponds to the pixel data 99 in FIG. 7B, which is in YUV 4:2:2 color model, i.e., the neighboring two pixels on the same row share the chrominance components U and V. $Y_{1a}$, $Y_{1b}$, $Y_{2a}$, and $Y_{2b}$ are respectively the Y components of pixel 1a, 1b, 2a and 2b. $U_{1a}$, and $V_{1a}$ are the chrominance components of pixel 1a. $U_{2a}$ and $V_{2a}$ are the chrominance components of pixel 2a.

In one embodiment, to convert the YUV 4:2:2 pixel data 99 into YUV 4:1:1 color model, the control signals from the state machine 50 instruct the logic 84 to perform the following actions:

$$Y'_{1a}=f(Y_{1a}, Y_{1a}, Y_{1a}, Y_{1a})=Y_{1a}; \quad (26)$$

$$Y'_{1b}=f(Y_{1b}, Y_{1b}, Y_{1b}, Y_{1b})=Y_{1b}; \quad (27)$$

$$Y'_{2a}=f(Y_{2a}, Y_{2a}, Y_{2a}, Y_{2a})=Y_{2a}; \quad (28)$$

$$Y'_{2b}=f(Y_{2b}, Y_{2b}, Y_{2b}, Y_{2b})=Y_{2b}; \quad (29)$$

$$U'=f(U_{1a}, U_{1a}, U_{2a}, U_{2a})=(U_{1a}+U_{2a})/2; \quad (30)$$

$$V'=f(V_{1a}, V_{1a}, V_{2a}, V_{2a})=(V_{1a}+V_{2a})/2. \quad (31)$$

Similar to what has been described in FIGS. 6A–6D, the above formula (26)–(31) can implemented by the format converter 51. In one embodiment, the data corresponding to $Y_{1a}$, $Y_{1b}$, $Y_{2a}$, $Y_{2b}$, $U_{1a}$, $V_{1a}$, $U_{2a}$ and $V_{2a}$ are respectively loaded into registers 420–427. To generate the YUV 4:1:1 video data $Y'_{1a}$, $Y'_{1b}$, $Y'_{2a}$ and $Y'_{2b}$, U' and V' representing the pixel block 98, the format converter 51 performs function f at each sub-state. For example, to implement the formula (26), the format converter 51 can select Y1a from the register 420 as the input video data on the four inputs 68–71. Thus, the result of performing the function f, $Y'_{1a}$, is the same as $Y_{1a}$. At another sub-state, to generate U' according to the formula (30), two of the inputs of the logic 84, e.g., the inputs selected by MUXS 85–86, are from the same register 424 ($U_{1a}$) and the other two inputs of the logic 84 are selected from the same register 426 ($U_{2a}$). As a result, the $U_{1a}$ and $U_{2a}$ will be averaged and output as U' as shown in (30). In a similar way, the $V_{1a}$ and $V_{2a}$ can be input from the registers 425 and 427 to the logic 84 to generate V' as shown in (31). By doing so, the format converter 51 uses the same data path and hardware architecture to convert YUV 4:2:2 progressive into YUV 4:1:1 as it uses to convert RGB Bayer video data into GBR 4:1:1.

Figure 8A:
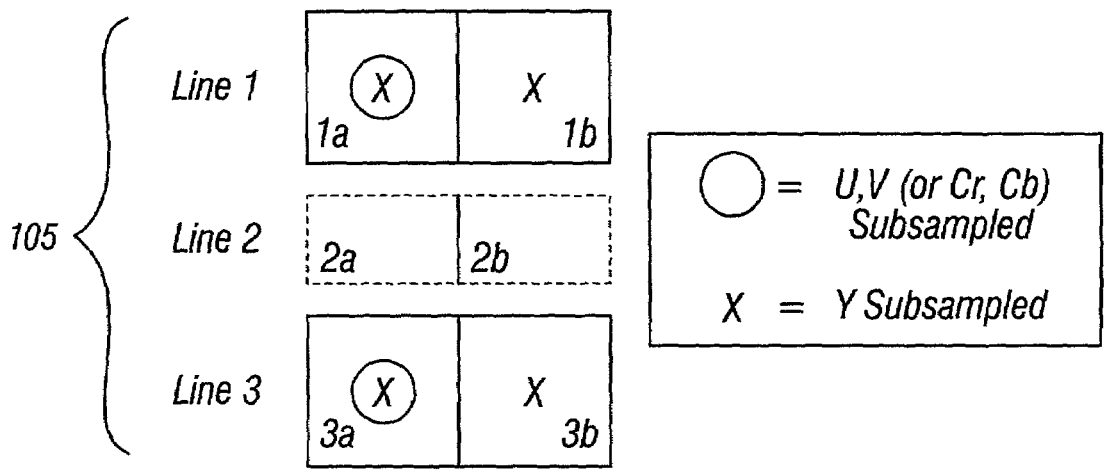
FIG. 8A is a graphical representation of a YUV 4:2:2 interlaced pixel pattern.
Figure 8B:
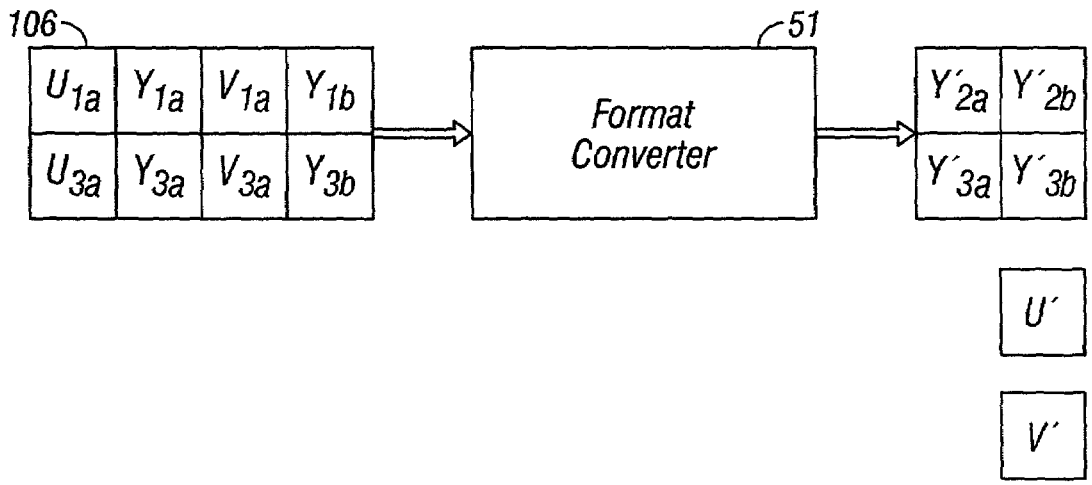
FIG. 8B is a graphical representation of the inputs and outputs for converting a YUV 4:2:2 interlaced pixel data signal into a YUV 4:1:1 video data signal.

FIGS. 8A and 8B illustrate an example of how a YUV 4:2:2 interlaced pixel pattern 105 is de-interlaced. The pixel pattern 105 is an example of 2×2 pixels (pixels 1a, 1b on odd line 1, pixels 3a and 3b on odd line 3 and no pixels on the even line 2 in 105) in an interlaced frame. To de-interlace, video data needs to be generate to represent pixels 2a, 2b on the even line 2.

FIG. 8B shows that in the pixel data 106, $Y_{1a}$, $Y_{1b}$, $Y_{3a}$, and $Y_{3b}$ are respective Y components of pixel 1a, 1b, 3a and 3b; $U_{1a}$, and $V_{1a}$ are the chrominance components of pixel 1a; and $U_{3a}$ and $V_{3a}$ are the chrominance components of pixel 3a. The pixel data 106 also does not contain information about the pixels 2a and 2b on line 2 since the input video is interlaced.

In one embodiment, to derive YUV 4:1:1 de-interlaced video, e.g., pixel data representing pixels on the two neighboring lines, line 2 and line 3, the control signals instruct the format converter 51 to do the following:

$$Y'_{2a}=f(Y_{1a}, Y_{1a}, Y_{3a}, Y_{3a})=(Y_{1a}+Y_{3a})/2; \quad (32)$$

$$Y'_{2b}=f(Y_{1b}, Y_{1b}, Y_{3b}, Y_{3b})=(Y_{1b}+Y_{3b})/2; \quad (33)$$

$$Y'_{3a}=f(Y_{3a}, Y_{3a}, Y_{3a}, Y_{3a})=Y_{3a}; \quad (34)$$

$$Y'_{3b}=f(Y_{3b}, Y_{3b}, Y_{3b}, Y_{3b})=Y_{3b}; \quad (35)$$

$$U'=f(U_{3a}, U_{3a}, U_{3a}, U_{3a})=U_{3a}; \quad (36)$$

$$V'=f(V_{3a}, V_{3a}, V_{3a}, V_{3a})=V_{3a}. \quad (37)$$

In the above formula, $Y'_{2a}$, $Y'_{2b}$, $Y'_{3a}$, $Y'_{3b}$, U' and V' (YUV 4:1:1) represent pixels on line 2 and line 3. By deriving YUV data for pixels on line 2, the input video data in YUV 4:2:2, is not only converted into YUV 4:1:1, but also is de-interlaced. For example, the format converter 51 is configured to select $Y_{1a}$, $Y_{1a}$, $Y_{3a}$ and $Y_{3a}$ through MUXS 85–88 to be the respective inputs of the logic 84 to generate $Y'_{2a}$, which is the average value of $Y_{1a}$ and $Y_{3b}$. Correspondingly, U' is generated by sending the same data $U_{3a}$ to the four inputs of the logic 84 in one sub-state; V' is generated by selecting $V_{3a}$ as the input to the logic 84 in another sub-state. By doing so, all the new YUV 4:1:1 data is generated to represent pixels 2a, 2b, 3a and 3b based on the interlaced input video data on line 1 and line 2.

Note that in alternate embodiments, the chrominance components U' and V' may also be configured as:

$$U'=f(U_{1a}, U_{1a}, U_{3a}, U_{3a})=(U_{1a}+U_{3a})/2; \quad (38)$$

$$V'=f(V_{1a}, V_{1a}, V_{3a}, V_{3a})=(V_{1a}+V_{3a})/2. \quad (39)$$

Thus, U' is an average of $U_{1a}$ and $U_{3a}$ and V' is the average of Via and $V_{3a}$.

Again, the above example shows that the VIP 16 does not need any extra hardware to handle interlaced video data. The above examples in FIGS. 6A–8B show that irrespective of the formats of the input video data to the format converter 51, RGB Bayer, or YUV 4:2:2 progressive or YUV 4:2:2 interlaced, the output of the format converter 51 is either GBR 4:1:1 or YUV 4:1:1. These two output formats are often preferred by video compression technologies. Thus, the video input video 16 greatly improves the video compression efficiency and the compatibility with different video sources.

Figure 5:
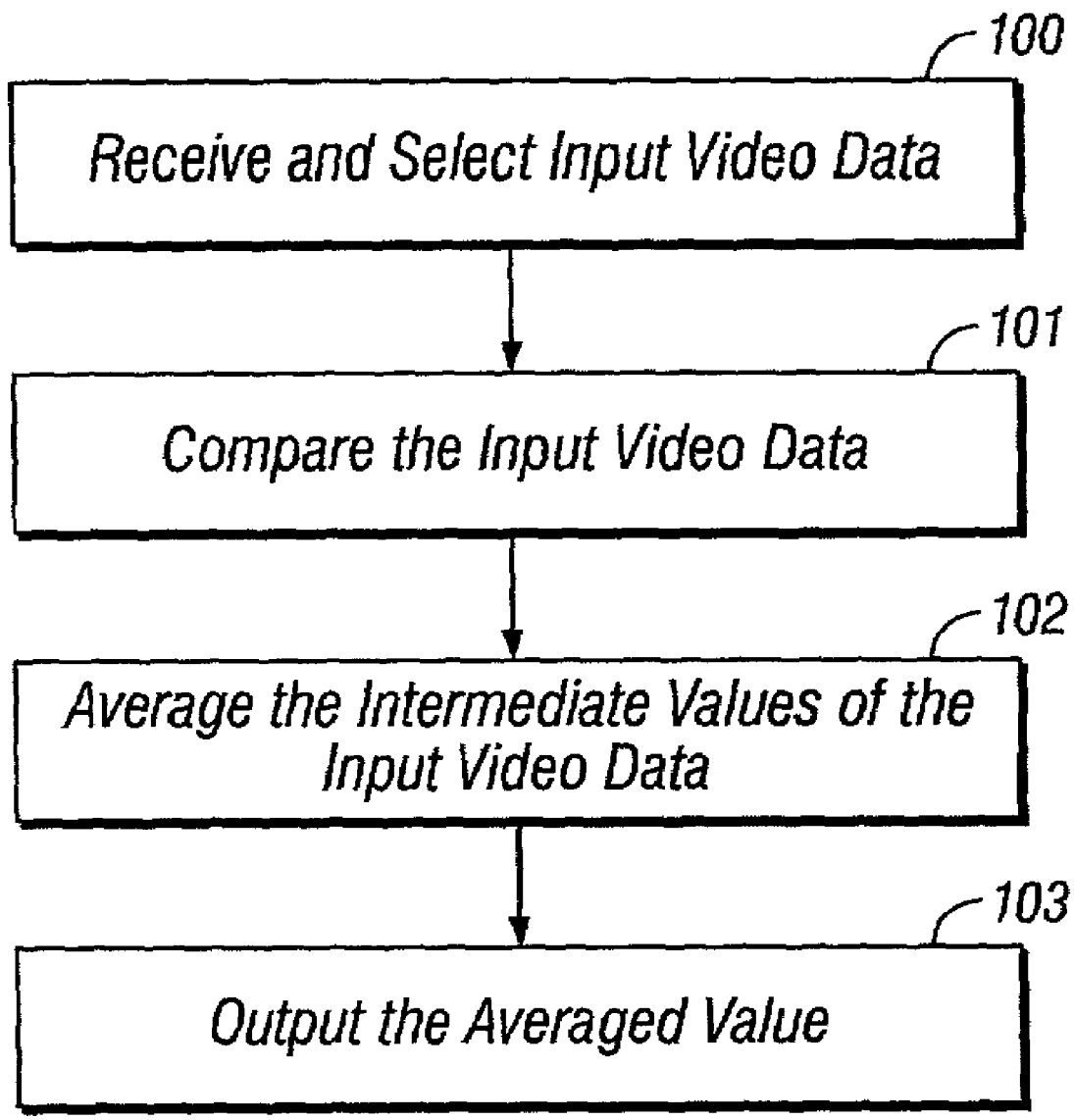
FIG. 5 is a flow chart showing steps for converting video inputs into a predetermined format.

As a brief summarization of the above examples, FIG. 5 is a flow chart showing the method for performing the format conversion. As described above, to convert input video data into a predetermined format, the input video data is received and selected 100 to enter the logic 84 for format conversion. The logic 84 uses its comparers 90a–90d to compare the input video data and filter out 101 the maximum and minimum values of the selected input video data. The intermediate values of the selected input video data are averaged 102 as an output of the format conversion process. The result of averaging the intermediate values is then output 103 to the next processing step.

It should be noted that the foregoing description of the format converter 51 and the examples of video format conversion process are not exhaustive of all the video formats that can be converted by the format converter 51. There are a variety of commonly used video formats that are related to RGB or YUV. One of ordinary skills in the art will recognize how to implement the method and use the format converter 51 to process these video formats into GRB 4:1:1 or YUV 4:1:1 prior to actual video compression.

It should also be understood that although the ratio 4:1:1 among digital video components is used for illustrating the video format conversion process, the present invention does not limit its application to one specific ratio. For example, the format converter 51 may be configured to convert different video inputs into a subsampling ratio 4:2:0. It is manifest based on the description of the present invention that the VIP 16 is capable of dealing with different video inputs and achieving desirable characteristics that benefit other related video conversion process and the following compression process.

Figure 9:
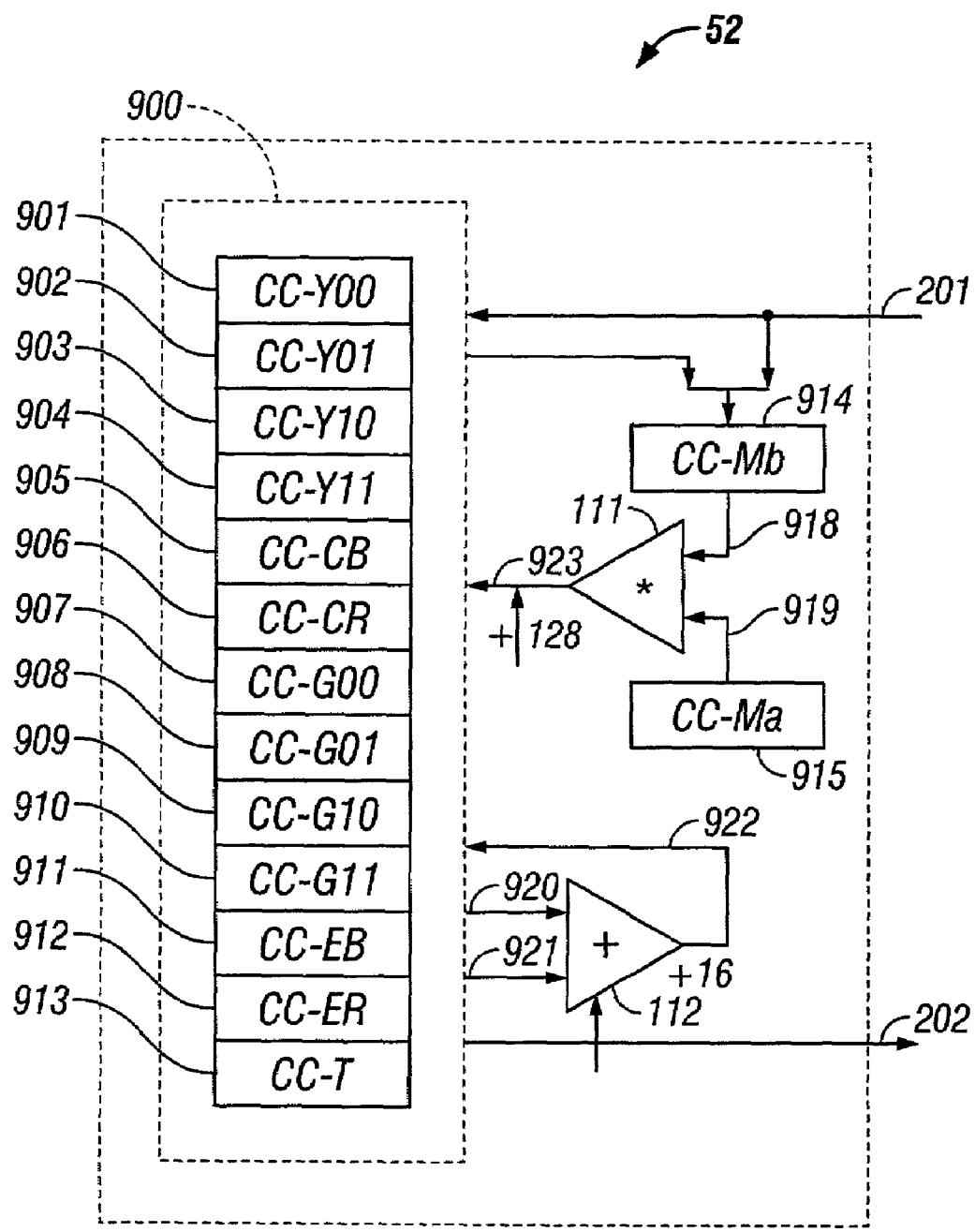
FIG. 9 is a block diagram of an embodiment of a color space converter.

FIG. 9 shows an embodiment of the color space converter 52 in accordance with the present invention. As mentioned above, video compression technologies usually prefer to compress the video data that is of YUV 4:1:1 format because of its advantages in saving data storage and transmission bandwidth. Thus, if the output 201 from the format converter 51 is GBR 4:1:1, the color space converter 52 converts the RGB video into YUV color space. If the output 201 from the format converter 51 is already in YUV 4:1:1 format, such YUV video data may simply pass through color space converter 52 without color space conversion.

As shown in FIG. 9, the color space converter 52 includes a color space conversion storage element 900, a multiplier 111, an adder 112, a multiplier data register 914, and a coefficient storage module 915. The color space converter 52 has an input signal line 201 to receive data from the format converter 51. As understood above, the input data from 201 is typically in GBR 4:1:1 format. The color space converter 52 is coupled to the scaler 53 through signal line 202. The output data of the color space converter 52 is in YUV color space.

In one embodiment, the storage element 900 includes 13 registers, 901–913. These registers 901–913 are used to store input data, output data as well as intermediate data that participate in the process of converting GBR 4:1:1 into YUV 4:1:1. In one embodiment, each of the registers 901–913 is a 9 bit register. The registers 907, 908, 909, 910, 905 and 906, referred to as CC_G00, CC_G01, CC_G11, and CC_G11, CC_CB and CC_CR, respectively store the values $G_{00}$, $G_{01}$, $G_{10}$, $G_{11}$, B and R of the input GBR 4:1:1 video. By way of example, $G_{00}$, $G_{01}$, $G_{10}$, $G_{11}$, B and R may correspond to $G'_{12}$, $G'_{11}$, $G'_{22}$, $G'_{21}$, B', R' as generated in the process represented in FIG. 6A. To load the data to the registers, the input data on the signal line 201 are latched into the registers 905–910 according to the heap addresses provided by the state machine 50.

The registers 901–904, referred to as CC_Y00, CC_Y01, CC_Y10, and CC_Y11, respectively store the value of luminance components $Y_{00}$, $Y_{01}$, $Y_{10}$, and $Y_{11}$, of the YUV 4:1:1 output. Registers 905 and 906 will also store a value of chrominance component Cr and Cb, i.e., U and V. As described below, a color space conversion algorithm is provided to generate YUV 4:1:1 values and store them in registers 901–906. The values are further transferred via the signal line 202 to the scaler 53.

In addition, registers 911 (CC_EB) and 912 (CC_ER) will store intermediate chrominance values during the operation of the color space conversion. The register 913, referred to as CC_T, will also be used to store intermediate values to participate in the color conversion. The detail of intermediate values will be described below.

In FIG. 9, the adder 112 is an ALU (arithmetic logic unit) that performs addition arithmetic operations needed in the color space conversion algorithm as provided in the present invention. In one embodiment, the adder 112 adds a 9-bit signed integer to another 9-bit signed integer. Two inputs 920 and 921 are coupled to the registers 901–913 except registers 907–910. The adder 112 also writes back the result to one of the registers 901–913 through the output 922 according to the heap address provided by the state machine 50. Depending on a mode control, the adder 112 can also subtract a 9-bit signed integer from another 9-bit signed integer. The adder 112 may also be coupled to a shift register to add an offset value of 16 in binary form to the adder 112's result.

The multiplier 111 is capable of performing multiplications operations that are needed for color space conversion algorithm. In one embodiment, the multiplier 111 multiplies a 9-bit signed integer by an 8-bit unsigned integer. The multiplier 111 receives the first input 918 from the multiplier data register 914, which is referred to as CC_Mb 914, and the second input 919 from the co-efficient storage module 915, which is referred to as CC_Ma 915. In one embodiment, the CC_Mb 914 is a 9 bit register. CC_Mb 914 reads data from one of the registers 907–912. The second input 919 from CC_Ma 915 is one of a plurality of pre-determined constant coefficients. In one embodiment, the CC_Ma 915 includes 8 bit hard wires to store a plurality of constant coefficients. A control signal from CBUS register block 307 selects a pre-determined co-efficient as the input on 919 of the multiplier 111. The result of the multiplication in the multiplier 111 is written to one of the registers 901–906, and 911–913 through the output 923 according to the heap address provided by the state machine 50. The output 923 of the multiplier 111 may also be coupled to a shift register so as to add an offset value of 128 in binary form to a result of the multiplier 111.

In one implementation, the color space converter 52 also receives additional control signals from the CBUS register block 307 and the state machine 50. The color space converter 52 receives setup information from the parameter registers in the block 307. The state machine 50 sends state signals to the color space converter 52 to enable the space conversion.

In general, to perform RGB-to-YUV color space conversion, the color space converter 52 computes the values of luminance components Y and chrominance components U and V based on the input RGB data values. Under conventional algorithm, e.g., the one provided by ITU-R BT. 470–2, a color space conversion algorithm is provided as follows:

$Y = c219 \times ey + 16$, wherein $ey = 0.587 \times G + 0.114 \times B + 0.229 \times R;$ \hfill (40)

$Cb = c224 \times epb + 128$, wherein $epb = -0.331 \times G' + 0.5 \times B - 0.169 \times R;$ and \hfill (41)

$Cr = c224 \times epr + 128$, wherein $epr = -0.419 \times G' - 0.881 \times B + 0.500 \times R.$ \hfill (42)

(c219 and c224 are constants which may conform to generally accepted color conversion standards)

In this recommended algorithm, the input GRB 4:1:1 video, e.g., $G_{00}$, $G_{01}$, $G_{10}$, $G_{11}$, B, R, are converted into corresponding Y, U, V components. Note that G', similar to what has been described above, is an average of Green components of the input video data. One of ordinary skills in the art should know there are a variety of ways to compute the average value of the Green components.

Such recommended algorithm or other conventional algorithms do not provide an optimal approach for the computations in (40)–(42) needed for the color space conversion. The recommended algorithm typically requires 12 clock cycles to complete the conversion from GBR 4:1:1 color space into YUV 4:1:1. The present invention advantageously provides an algorithm to reduce the number of clock cycles necessary for color space conversion, thus substantially expediting the color conversion process and making the entire video compression process more efficient. In a preferred embodiment, the color space converter 52 provides a unique algorithm which uses 11 clock cycles to complete a color space conversion from GBR 4:1:1 to YUV 4:1:1.

Figure 10:
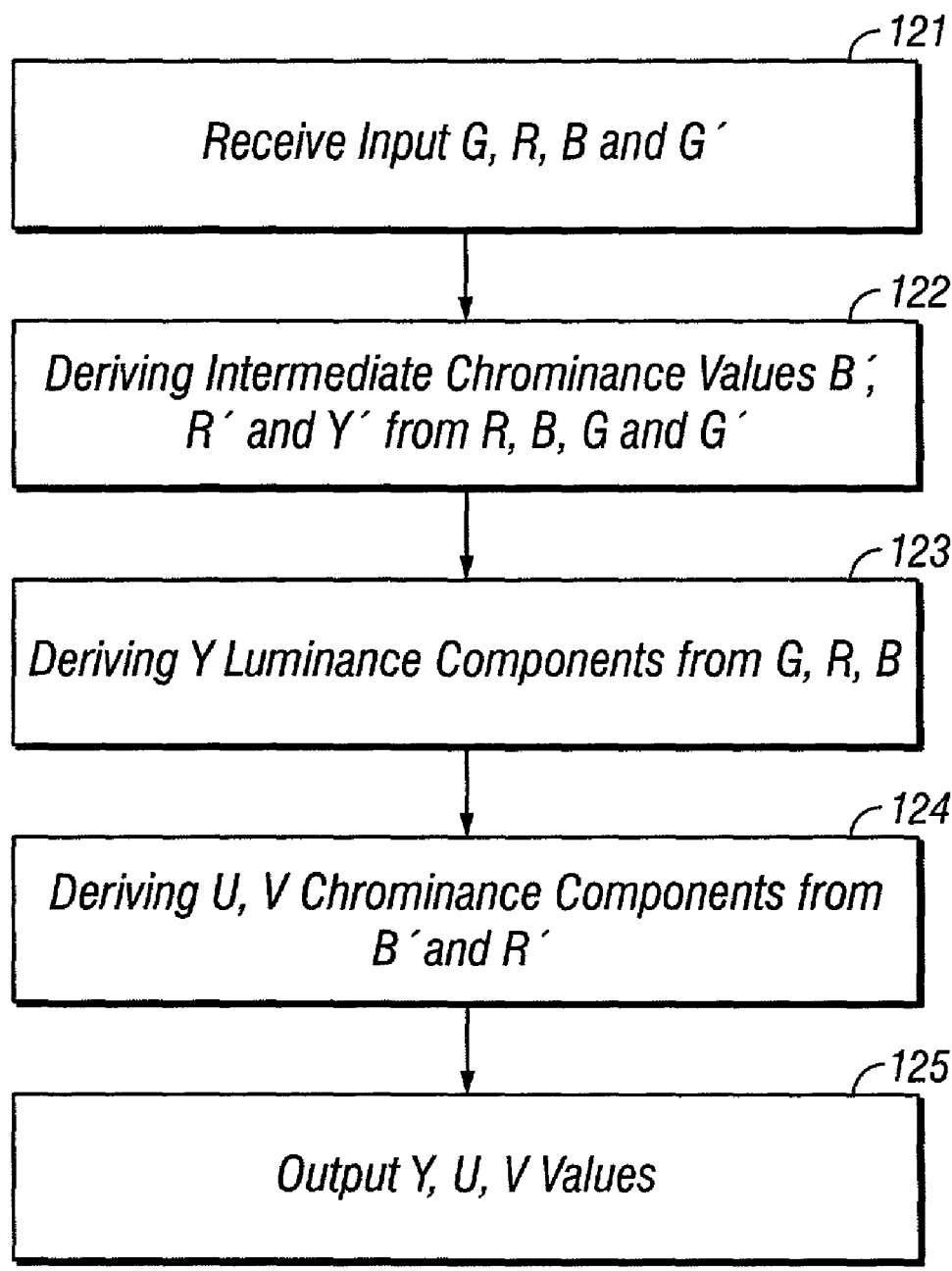
FIG. 10 is a flow chart of a method for color space conversion.

To illustrate the method of the color space conversion, FIG. 10 shows steps of implementing the algorithm provided by the present invention. The algorithm starts 121 by receiving RGB video input. For example, if the input data correspond to 2×2 pixel block in the format of GBR 4:1:1, the input data include $G_{00}$, $G_{01}$, $G_{10}$, $G_{11}$, R, B, and a value G' representing the average value of Green color components. In one example, G' may be an average of selected Green components. As illustrated above in FIG. 6A, the RGB Format converter 51 generates an average value of $G'_{12}$ and $G'_{21}$ and outputs the average value as G' for color space conversion. In this way, the RGB Format converter 51 also facilitates color space conversion by reducing a step of computing the averaged G' in the color space converter 52.

While receiving the input values of each G component, G', R and B, intermediate chrominance values, B' and R', are calculated 122 based on the input G, R and B. One aspect of the present invention simplifies the color space conversion computation by using a linearity relationship between the intermediate chrominance values B' and R', and the chrominance components B, R and an averaged luminance component Y' as follows:

$$Y' = \gamma \times G' + \theta \times B + \phi \times R; \quad (43)$$

$$B' = \alpha \times B - Y'; \quad (44)$$

$$R' = \alpha \times R - Y'; \quad (45)$$

$$U = m \times B'; \quad (46)$$

$$V = n \times R' \quad (47)$$

($\alpha$, $\gamma$, $\theta$, $\phi$, m and n, are co-efficients)

After deriving the intermediate values B' and R', the luminance Y components are calculated 123 based on each of the four G components, B, and R using standard algorithm provided as shown in (48) below. Eventually, the chrominance value U (or Cb) and V (or Cr) are computed by (46) and (47).

$$Y = \gamma \times G + \theta \times B + \phi \times R; \quad (48)$$

The computed Y, U and V values are then sent 125 through 202 as output of the color space conversion process.

Note that the co-efficients, $\alpha$, $\gamma$, $\theta$ and $\phi$ as well as m and n, are known according to the linearity relationships defined in (43)–(47) and the conventional color space definition, as shown in (40)–(42). The coefficients may be selected from any one of a number of sets which satisfy the above-referenced definitions as shown in (40)–(47), and may change depending on the specific application.

In view of the above description, one aspect of the present invention advantageously reduces the computing loads in the color space conversion by simplifying the process of deriving chrominance components. One of ordinary skills in the art will recognize that there may be modified algorithms to compute U or V based on the linearity relationship described above in (43)–(45). All such modified algorithms should be considered as not departing from the spirit and principle of the present invention.

Figure 11:
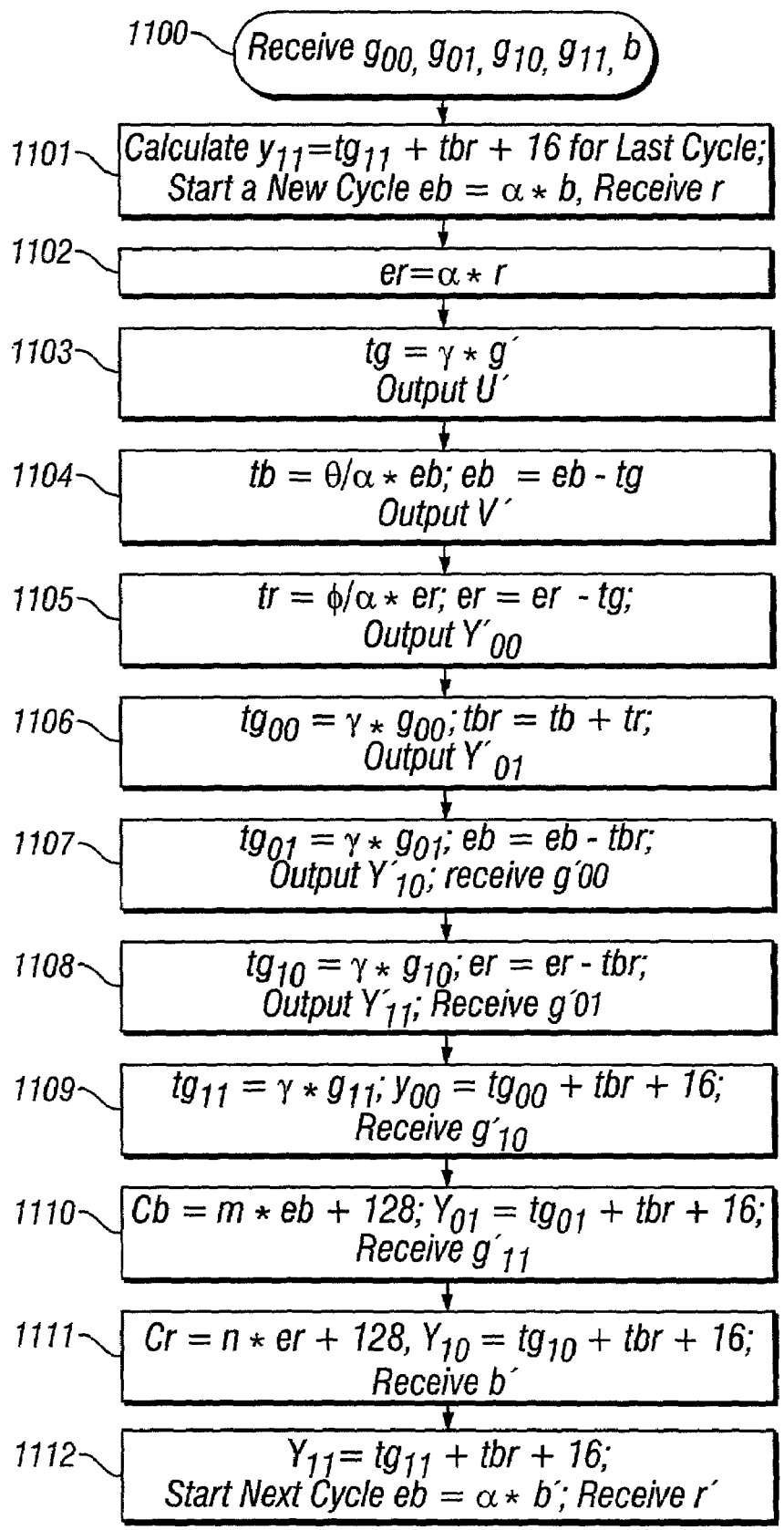
FIG. 11 is a flow chart of a color space conversion algorithm for converting video data from the RGB color space into the $YC_rC_b$ (YUV) color space.

FIG. 11 is a flow chart illustrating the algorithm of color space conversion for using the hardware design as shown in FIG. 9. Still using the process illustrated in FIG. 10, the input data to be converted corresponds to a 2×2 pixel block in the format of GBR 4:1:1, which includes $g_{00}$, $g_{01}$, $g_{10}$, $g_{11}$, r, b, and a value g' representing the average value of Green color components. The result of the color space conversion will generate $y_{00}$, $y_{01}$, $y_{10}$, $y_{11}$, u(or cr), v(or cb) in 11 clock cycles. Assume at each state of the color space conversion one 2×2 pixel block is processed. According to the present invention, each step may be completed in one clock cycle.

In a preferred embodiment, the process of loading data values of $g_{00}$, $g_{01}$, $g_{10}$, $g_{11}$, b and r may have started in the previous state. For example, $g_{00}$, $g_{01}$, $g_{10}$, $g_{11}$, b have been received and loaded into the registers 907, 908, 909, 910 and 905 respectively by the end of the previous color conversion state. The description below will introduce the detail of preloading the input video data of a data block from 200 for next state.

At step 1101, part of the tasks will be a completion of computing a luminance component $Y'_{11}$ in the previous state. $Y'_{11}$ is generated and stored in the register 904 and waits to be output on the signal line 202. In fact, the RGB-to-YUV conversion results of the previous state, $Y'_{00}$, $Y'_{01}$, $Y'_{10}$, $Y'_{10}$, $Y'_{11}$, U' and V' are still stored in the registers 301–306 and will be output in a timely manner so that the result of the current state, $g_{00}$, $g_{01}$, $g_{10}$, $g_{11}$, b and r, can be stored in the storage element 900.

Another part of the tasks of the step 1101 will be the initiation of a new color conversion cycle for the current GBR data block by multiplying value b (blue color component) with the constant co-efficient $\alpha$. To implement this, the value b was loaded in the register 905 and latched into CC_Mb 914 for multiplication. The constant $\alpha$ is read from the register CC_Ma 915 and input to the multiplier 111. The result is an intermediate value eb, which is written and stored in CC_Eb 911. The current value of eb corresponds to the term $\alpha \times B$ as in (44). The final value of eb, as described below, will be the intermediate chrominance value B' defined in (44). Also in step 1101, the data value r of red component is loaded into the register CC_CR 906 from the signal line 201 and then into CC_Mb 914 for next multiplier operation.

At step 1102, an intermediate value er, whose final outcome is the intermediate chrominance value R' as defined in (45), is derived by multiplying the co-efficient $\alpha$ with r and the output er is stored in CC_Eb 911. The current value of er corresponds to $\alpha \times R$ as shown in (45).

At step 1103, an intermediate value tg is obtained by multiplying the co-efficient $\gamma$ with g' and the output is stored in the register CC_T 913 temporarily. The current value tg corresponds to $\gamma \times G'$ as in (43). In a preferred embodiment, the color space converter 52 can output the value U' (or Cb)

as generated in the previous state and currently stored in the register 305 to the signal line 202.

At step 1104, two operations occur at the multiplier 111 and the adder 112 respectively. At the multiplier 111, an intermediate value tb is generated from multiplying $\theta/\alpha$ with eb and is stored in CC_Cb 905. The value of tb corresponds to the term $\theta \times B$ in (43). er is written into CC_Mb 914 and a co-efficient $\phi/\alpha$ is written into CC_Ma 915. Then at the adder 112, eb and tg are input to the adder 112 and tg is subtracted from eb. The result of eb is still stored in CC_Eb 911. The current eb corresponds to a value of $\alpha \times B - \gamma \times G'$ as shown in (43) and (44). Also at this step, the preferred embodiment of the present invention outputs V' (or Cr) that is generated in the previous state and currently stored in the register 306.

At step 1105, the multiplier 111 calculates another intermediate value tr as a result of multiplying the constant $\phi/\alpha$ with er and stores tr at CC_Cr 906. tr corresponds to the term $\phi \times R$ as in (43). The adder 112 subtracts tg from er and sends new er back to the register CC_Er 912. The current value of er corresponds to the term $\alpha \times R - \gamma \times G'$ as shown in (43) and (45). Also at this step, the converter 52 now outputs $Y'_{00}$ that is stored in the register 901 as the result of the previous state.

At step 1106, the multiplier 111 derives an intermediate value tg00 by multiplying $\gamma$ and $g_{00}$ and stores tg00 at the register CC_Y00 901. As understood above, the register 901 is now available since the result of the previous state $Y'_{00}$ has been output in the step 1105. tg00 now corresponds to the term $\gamma \times G$ ($\gamma \times g_{00}$) in (48). As will be mentioned below, tg01 ($\gamma \times g_{01}$), tg10 ($\gamma \times g_{10}$) and tg11 ($\gamma \times g_{11}$) will be respectively computed to derive the four Y components. This step will also enable the adder 112 to generate an intermediate value trb by adding tb and tr. trb is stored in the register CC_T 913, which corresponds to the term $\theta \times B + \phi \times R$ as in (43). Again, the color space converter 52 continues outputting the result of the previous state by sending the value $Y'_{01}$ stored in the register 902 to the signal line 202.

At step 1107, the multiplier 111 computes tg01 by multiplying $g_{01}$ with co-efficient $\gamma$ and stores the result in the register CC_Y01 902, which is available after the step 1106. The adder 112 computes a new value eb by subtracting tbr from the previous value of eb and returns the result to CC_Eb 911. At this stage, the final value of eb corresponds to the value of the intermediate chrominance B' as in (44). It will be used to compute the chrominance value u(or Cb). At this step, the value $Y'_{10}$ will be output to the signal line 202. Also at this step, a preferred embodiment of the converter 52 can start to prepare for the operation at next state by loading a new value of $g'_{00}$ from the signal line 201 to the register CC_G00 907. Note, the register CC_G00 907 can be overwritten since the value $g_{00}$ has been used in the step 1106 and will no longer be used in the following steps.

At step 1108, the multiplier 111 computes tg10 by multiplying $g_{10}$ with co-efficient $\gamma$ and stores the result in the register CC_Y10 903. The adder 112 computes the final value of er by subtracting tbr from the previous value of er and returns the result to CC_Er 912. Now, the final value of er corresponds to the value of the intermediate chrominance R' as defined in (45). It will be used to compute the chrominance value v(or Cr). This step will also be the last step of outputting the results of the previous state. It outputs $Y'_{11}$ to the signal line 202. Thus, the $Y'_{00}$, $Y'_{01}$, $Y'_{10}$, $Y'_{11}$, U' and V' from the previous state have been all sent out to the scaler 53 via 202. In addition, the step continues to load next green component $g'_{01}$ from the signal line 201 and store it into the register CC_G01 908 for the next state.

At step 1109, the multiplier 111 computes tg11 by multiplying $g_{01}$ with co-efficient $\gamma$ and stores the result in CC_Y11 904. The adder 112 now computes the luminance value $y_{00}$ by adding tg00 and tbr that is stored in CC_T 913. If an offset is necessary, a value of 16 is added to the result and the result is stored in CC_Y00 901. The computation of $y_{00}$ corresponds to the formula (48). As understood, this $y_{00}$ will not be output to the signal line 202 until the next state. At the same time, $g'_{10}$ is loaded into the converter 52 and stored in the register CC_G10 909.

At step 1110, the multiplier 111 computes the chrominance component Cb by multiplying eb with a constant co-efficient m as defined in (46). An offset value of 128 is added to the result when necessary. The result is stored in CC_Cb 905. The adder 112 computes the luminance value $y_{01}$ by adding tg01 and tbr that is stored in CC_T 913. Similarly, if an offset is necessary, the result adds an offset value of 16 and is stored in CC_Y01 902. At the same time, $g'_{11}$ is loaded into the converter 52 and stored in the register CC_G10 909 to prepare for next state operation.

At step 1111, the multiplier 111 computes the chrominance component Cr by multiplying er with another constant co-efficient n as defined in (47). An offset value of 128 is added to the result when necessary. The result is stored in the register CC_Cr 906 and will be output to the signal line 202 during the next cycle. The adder 112 computes the luminance value $y_{10}$ by adding tg10 and tbr. Again, if an offset is necessary, a value of 16 is added to the result the result is stored in CC_Y10 903. Also at this step, a new blue component value b' is loaded and stored into CC_Cb 905 for next state.

At the step 1112, which is the last clock cycle required for completing the calculation for the current state, the last remaining luminance component $y_{11}$ is computed by adding tg11 and tbr. The result is stored in CC_Y11 904. Here, a new red value r' is received and a new value of eb' is computed as a beginning step for the next state. It can be understood that similar procedures and steps will be implemented to perform the color space conversion for the next state. During the next state, the results of the current states will be output to the signal line 202 in a similar manner as described above.

The steps and data path described in FIG. 11 are introduced merely as an example to implement the algorithm for color space conversion in accordance with the present invention. Various modifications, changes and variations, which will be apparent to those skilled in the art, may be made in operation and detail of the method for color space conversion disclosed herein. For example, the actual coefficients may not be exactly identical to what have been disclosed.

The foregoing discussion discloses and describes various embodiments of the VIP 16 and its components as well as a variety of methods to process input video prior to actual video compression. The present invention provides an advantageous approach to cope with a wide variety of analog and digital video formats. The pre-compression processing by the VIP 16 achieves a desirable output video format for ensuing video compression in a cost-effective manner. The unique algorithm provided hereinwith improves conventional approach and substantially saves hardware costs. In addition, the VIP 16 also integrates multiple video enhancement functionalities. The functionalities greatly increase the adaptability of a video compression system.

The foregoing discussion discloses and describes merely exemplary methods and embodiments of the present invention.

As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A video input processor, comprising:
   a first buffer to store an input video data, the input video data corresponding to values of a plurality of video components for a video image formatted according to one of several potential video data formats; and
   a video format converter, coupled to the first buffer to receive the input video data, configured to convert the input video data from its initial video format to a uniform video format and to generate a first video output corresponding to the converted input video data, wherein the uniform video format corresponds to a ratio between different components of the input video data, the video format converter further comprising:
      a storage element, coupled to the first buffer, configured to receive the input video data from the first buffer, and to select and output a portion of the input video data responsive to a control signal, wherein the storage element has a pre-determined number of outputs; and
      a logic module, coupled to the storage element, configured to receive the selected portion of the input video data from the predetermined number of outputs of the storage element, and further configured to compare the portion of input video data received from the storage element and to generate an averaged output by averaging the intermediate values of the received portion of input video data.

2. The video input processor of claim 1, wherein the input video data is in a format selected from a group consisting of RGB bayer, YUV 4:2:2 progressive, and YUV 4:2:2 interlaced video.

3. The video input processor of claim 1, wherein the storage element comprises:
   a plurality of registers for storing the input video data received from the first buffer; and
   a plurality of multiplexers, each of which is coupled to the plurality of registers, configured to receive the control signal, and, each cooperating to select the portion of input video data from the plurality of registers to transfer to the logic module via one of the predetermined number of outputs responsive to the control signal.

4. The video input processor of claim 1, wherein the logic module comprises:
   a first comparer, receiving a first video input and a second video input from the predetermined number of outputs of the storage element, comparing the first video input and a second video input and outputting the larger valued video input to a first comparer output and outputting the smaller valued video input to a second comparer output;
   a second comparer, receiving a third video input and a fourth video input from the predetermined number of outputs of the storage element, comparing the third video input and the fourth video input, and outputting the larger valued video input to a third comparer output and outputting the smaller valued video input to a fourth comparer output;
   a third comparer, receiving the first comparer output from the first comparer and the third comparer output from the second comparer and configured to compare the first and third comparer outputs and to output the lesser valued comparer output as a first comparison result;
   the fourth comparer, receiving the second comparer output from the first comparer and the fourth comparer output from the second comparer and configured to compare the second and fourth comparer outputs and to output the greater valued comparer output as a second comparison result; and
   a mean generator, coupled to the third comparer and the fourth comparer to receive the first and second comparison results, configured to generate an average of the first and second comparison results as the output of the logic module.

5. The video input processor of claim 4, wherein the logic module further comprises:
   a first comparison register, coupled to the first comparer, configured to store the first comparer output and to provide the first comparer output to the third comparer;
   a second comparison register, coupled to the first comparer, configured to store the second comparer output and to provide the second comparer output to the fourth comparer;
   a third comparison register, coupled to the second comparer, configured to store the third comparer output and to provide the third comparer output to the third comparer; and
   a fourth comparison register, coupled to the second comparer, configured to store the fourth comparer output and to provide the fourth comparer output to the fourth comparer.

6. The video input processor of claim 1, further comprising:
   a color space converter, coupled to the video format converter, configured to convert the first video output into a second video output, wherein the second video output is in a color-space format that is suited for video compression processing.

7. The video input processor of claim 6, wherein the first video output is in the format of RGB.

8. The video input processor of claim 7, wherein the color space converter receives an average value of green color components from the video format converter.

9. The video input processor of claim 7, wherein the second video output is in the YUV 4:1:1 format.

10. The video input processor of claim 1, further comprising:
    a video scaler, coupled to the color space converter, configured to spatially subsample the input video data to obtain a pre-determined size of output video.

11. The video input processor of claim 10, wherein the video scaler has a module configured to generate a QY parameter for video motion estimation and compensation.

12. The video input processor of claim 10, further comprising:
    a second data buffer, coupled to the video scaler, configured to store an output video data and to provide the output video data for further processing.

13. The video input processor of claim 12, further comprising:
    a video-filtering module, coupled to the second buffer, configured to improve the quality of the stored output video data in the second buffer.

14. The video input processor of claim 1, further comprising:
    a sub-window processing module, coupled to a video source generating the input video data and to the first buffer, configured to crop the size of video object represented by the input video data.

15. A method for processing video data prior to video compression, comprising:

receiving the video data, the video data comprising at least three video components and being in a format selected from a group consisting of RGB bayer, YUV 4:2:2 progressive and YUV 4:2:2 interlaced;

selecting a portion of the video data responsive to a control signal;

outputting, from a pre-determined number of outputs, the portion of the video data selected;

receiving, by a logic module, the selected portion of the video data from the predetermined number of outputs;

comparing, by the logic module, the portion of video data received to generate an averaged output by averaging the intermediate values of the received portion of video data; and generating a first video output by converting the video data into a pre-determined video format, wherein the predetermined format corresponds to a ratio between the video components.

16. The method of claim 15, wherein the ratio between the different video components is 4:1:1.

17. The method of claim 15, further comprising:

performing a color space conversion for the first video output, wherein the first video output is in the format of RGB; and generating a second video output based on the first video output, wherein the second video output is in the format of YUV.

18. The method of claim 17, further comprising:

performing a video scaling process for the second video output; and generating a third video output.

19. The method of claim 18, further comprising:

storing the third video output; and performing a video filtering to enhance the stored third video output.

20. A multi-format video compression system, the system receiving input video data from various video sources that generate different formats of the input video data, the system comprising:

a processor, controlling the operation of the video compression system; and a video input processor, configured to receive the input video data in different formats from different video sources and to convert the input video data in different formats into a uniform format to optimize the video compression in response to control signals received from the processor, the video input processor further comprising:

a storage element configured to receive the input video data and to select and output a portion of the input video data responsive to a control signal, wherein the storage element has a pre-determined number of outputs; and a logic module, coupled to the storage element, configured to receive the selected portion of the input video data from the predetermined number of outputs of the storage element, and further configured to compare the portion of input video data received from the storage element and to generate an averaged output by averaging the intermediate values of the received portion of input video data.

* * * * *